(12) United States Patent
Gupta et al.

(10) Patent No.: US 12,353,717 B2
(45) Date of Patent: Jul. 8, 2025

(54) LOCALIZED AND RELOCATABLE SOFTWARE PLACEMENT AND NOC-BASED ACCESS TO MEMORY CONTROLLERS

(71) Applicant: Xilinx, Inc., San Jose, CA (US)

(72) Inventors: Aman Gupta, Sunnyvale, CA (US); Krishnan Srinivasan, San Jose, CA (US); Shishir Kumar, Hyderabad (IN); Sagheer Ahmad, Cupertino, CA (US); Ahmad R. Ansari, San Jose, CA (US)

(73) Assignee: Xilnix, Inc., San Jose, CA (US)

( * ) Notice: Subject to any disclaimer, the term of this patent is extended or adjusted under 35 U.S.C. 154(b) by 8 days.

(21) Appl. No.: 18/145,339

(22) Filed: Dec. 22, 2022

(65) Prior Publication Data

US 2024/0211138 A1    Jun. 27, 2024

(51) Int. Cl.
G06F 3/06    (2006.01)

(52) U.S. Cl.
CPC .......... *G06F 3/0611* (2013.01); *G06F 3/0629* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004;
(Continued)

(56) References Cited

U.S. PATENT DOCUMENTS

| | | |
|---|---|---|
| 3,776,137 A | 12/1973 | Abbott |
| 4,876,641 A | 10/1989 | Cowley |

(Continued)

OTHER PUBLICATIONS

L. Masing et al., "In-NoC Circuits for Low-Latency Cache Coherence in Distributed Shared-Memory Architectures," 2018 IEEE 12th International Symposium on Embedded Multicore/Many-core Systems-on-Chip, Hanoi, Vietnam, 2018, pp. 138-145, doi: 10.1109/MCSoC2018.2018.00033. (Year: 2018).*

(Continued)

*Primary Examiner* — Daniel C. Chappell
(74) *Attorney, Agent, or Firm* — Kevin T. Cuenot

(57) ABSTRACT

A system includes a plurality of processing elements and a plurality of memory controllers. The system includes a network on chip (NoC) providing connectivity between the plurality of processing elements and the plurality of memory controllers. The NoC includes a sparse network coupled to the plurality of processing elements and a non-blocking network coupled to the sparse network and the plurality of memory controllers. The plurality of processing elements execute a plurality of applications. Each application has a same deterministic memory access performance in accessing associated ones of the plurality of memory controllers via the sparse network and the non-blocking network of the NoC.

20 Claims, 16 Drawing Sheets

1600

Execute, by a plurality of processing elements, a plurality of applications
1602

Submit, from the plurality of applications, memory access requests to a plurality of memory controllers
1604

Route the memory access requests through a network-on-chip (NoC) to the plurality of memory controllers, wherein the NoC includes a sparse network coupled to the data processing array and a local network coupled to the sparse network and the plurality of memory controllers, wherein the routing conveys the memory access requests through the sparse network and the non-blocking network of the NoC to different ones of the plurality of memory controllers with a same deterministic memory access performance for each memory access request
1606

(58) Field of Classification Search
CPC ........ G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 5,848,264 | A | 12/1998 | Baird et al. |
| 6,090,156 | A | 7/2000 | MacLeod |
| 6,091,263 | A | 7/2000 | New et al. |
| 6,150,839 | A | 11/2000 | New et al. |
| 6,204,687 | B1 | 3/2001 | Schultz et al. |
| 6,462,579 | B1 | 10/2002 | Camilleri et al. |
| 6,526,557 | B1 | 2/2003 | Young et al. |
| 6,759,869 | B1 | 7/2004 | Young et al. |
| 6,810,514 | B1 | 10/2004 | Alfke et al. |
| 6,836,842 | B1 | 12/2004 | Guccione et al. |
| 6,907,595 | B2 | 6/2005 | Curd et al. |
| 7,024,651 | B1 | 4/2006 | Camilleri et al. |
| 7,057,413 | B1 | 6/2006 | Young et al. |
| 7,080,283 | B1 | 7/2006 | Songer |
| 7,124,338 | B1 | 10/2006 | Mark et al. |
| 7,182,006 | B1 | 2/2007 | Wu |
| 7,185,309 | B1 | 2/2007 | Kulkarni |
| 7,224,184 | B1 | 5/2007 | Levi et al. |
| 7,281,093 | B1 | 10/2007 | Kulkarni et al. |
| 7,302,625 | B1 | 11/2007 | Payakapan et al. |
| 7,380,035 | B1 | 5/2008 | Donlin |
| 7,394,288 | B1 | 7/2008 | Agarwal |
| 7,454,658 | B1 | 11/2008 | Baxter |
| 7,477,072 | B1 | 1/2009 | Kao et al. |
| 7,478,357 | B1 | 1/2009 | Mason et al. |
| 7,482,836 | B2 | 1/2009 | Levi et al. |
| 7,500,060 | B1 | 3/2009 | Anderson et al. |
| 7,509,617 | B1 | 3/2009 | Young |
| 7,518,396 | B1 | 4/2009 | Kondapalli et al. |
| 7,521,961 | B1 | 4/2009 | Anderson |
| 7,546,572 | B1 | 6/2009 | Ballagh et al. |
| 7,574,680 | B1 | 8/2009 | Kulkarni et al. |
| 7,619,442 | B1 | 11/2009 | Mason et al. |
| 7,640,527 | B1 | 12/2009 | Dorairaj et al. |
| 7,650,248 | B1 | 1/2010 | Baxter |
| 7,724,815 | B1 | 5/2010 | Raha et al. |
| 7,746,099 | B1 | 6/2010 | Chan et al. |
| 7,788,625 | B1 | 8/2010 | Donlin et al. |
| 7,831,801 | B1 | 11/2010 | Anderson |
| 7,882,386 | B1* | 2/2011 | Potnis ................ G06F 11/1435 |
| | | | 714/2 |
| 8,006,021 | B1 | 8/2011 | Li et al. |
| 8,020,163 | B2 | 9/2011 | Nollet et al. |
| 8,045,546 | B1 | 10/2011 | Bao et al. |
| 8,102,188 | B1 | 1/2012 | Chan et al. |
| 8,214,694 | B1 | 7/2012 | McKechnie et al. |
| 8,250,342 | B1 | 8/2012 | Kostarnov et al. |
| 8,359,448 | B1 | 1/2013 | Neuendorffer |
| 8,415,974 | B1 | 4/2013 | Lysaght |
| 8,719,750 | B1 | 5/2014 | Balzli, Jr. |
| 8,719,808 | B1 | 5/2014 | Prinzing |
| 8,796,539 | B2 | 8/2014 | Asaumi et al. |
| 8,928,351 | B1 | 1/2015 | Konduru |
| 9,081,634 | B1 | 7/2015 | Simkins et al. |
| 9,218,443 | B1 | 12/2015 | Styles et al. |
| 9,436,785 | B1 | 9/2016 | Javre et al. |
| 9,578,099 | B2 | 2/2017 | Llorca et al. |
| 9,722,613 | B1 | 8/2017 | Schultz et al. |
| 9,911,465 | B1* | 3/2018 | Camarota ........... H01L 25/0652 |
| 10,243,882 | B1 | 3/2019 | Swarbrick et al. |
| 10,252,011 | B2 | 4/2019 | Garde et al. |
| 10,452,266 | B2* | 10/2019 | Gaikwad ............. G06F 3/0673 |
| 10,452,272 | B2* | 10/2019 | Gaikwad ............. G06F 3/0673 |
| 11,496,418 | B1 | 11/2022 | Blair et al. |
| 11,520,499 | B1* | 12/2022 | Cermak ............... G06F 3/0634 |
| 12,050,789 | B2* | 7/2024 | Cermak ............... G06F 3/0679 |
| 12,204,759 | B1* | 1/2025 | Farjadrad ............ G06F 3/0673 |
| 2004/0071133 | A1* | 4/2004 | Yusko ................. H04L 12/2885 |
| | | | 370/356 |
| 2004/0114609 | A1 | 6/2004 | Swarbrick et al. |
| 2004/0210695 | A1 | 10/2004 | Weber et al. |
| 2007/0006137 | A1 | 1/2007 | Savagaonkar et al. |
| 2008/0082759 | A1 | 4/2008 | Pong |
| 2008/0320255 | A1 | 6/2008 | Wingard |
| 2008/0320268 | A1 | 6/2008 | Wingard |
| 2010/0322237 | A1 | 12/2010 | Raja |
| 2012/0036296 | A1 | 2/2012 | Chou |
| 2012/0310983 | A1 | 8/2012 | Mittal |
| 2013/0073771 | A1* | 3/2013 | Hanyu ................ H04L 12/6418 |
| | | | 710/305 |
| 2014/0115298 | A1* | 4/2014 | Philip ................. G06F 30/394 |
| | | | 712/29 |
| 2014/0331027 | A1* | 11/2014 | Philip ................... G06F 13/40 |
| | | | 712/29 |
| 2017/0140800 | A1 | 5/2017 | Wingard et al. |
| 2017/0195258 | A1 | 7/2017 | Wang et al. |
| 2017/0220499 | A1 | 8/2017 | Gray |
| 2017/0315944 | A1 | 11/2017 | Mayer et al. |
| 2019/0081635 | A1* | 3/2019 | Kurahashi ............. H03M 1/468 |
| 2020/0026684 | A1* | 1/2020 | Swarbrick ........... G06F 15/7825 |
| 2022/0197855 | A1* | 6/2022 | Ganusov ............ G06F 15/7867 |
| 2022/0337923 | A1* | 10/2022 | Gupta ................. G06F 13/4027 |

OTHER PUBLICATIONS

A. Kuti Lusala et al., "A hybrid NoC combining SDM-based circuit switching with packet switching for real-time applications," NORCHIP 2010, Tampere, Finland, 2010, pp. 1-4, doi: 10.1109/NORCHIP. 2010.5669434. (Year: 2010).*

Ashraf Elantably. Study of task migration in a multi-tiled architecture. Automatic generation of an agent based solution. Micro and nanotechnologies/Microelectronics. Université Grenoble Alpes, 2015. (Year: 2015).*

I. Swarbrick et al., "Versal Network-on-Chip (NoC)," 2019 IEEE Symposium on High-Performance Interconnects (HOTI), Santa Clara, CA, USA, 2019, pp. 13-17, doi: 10.1109/HOTI.2019.00016. (Year: 2019).*

A. Mirhosseini, M. Sadrosadati, B. Soltani, H. Sarbazi-Azad and T. F. Wenisch, "BiNoCHS: Bimodal network-on-chip for CPU-GPU heterogeneous systems," 2017 Eleventh IEEE/ACM International Symposium on Networks-on-Chip (NOCS), Seoul, Korea (South), 2017, pp. 1-8. (Year: 2017).*

S. K. Mandal et al., "A Latency-Optimized Reconfigurable NoC for In-Memory Acceleration of DNNs," in IEEE Journal on Emerging and Selected Topics in Circuits and Systems, vol. 10, No. 3, pp. 362-375, Sep. 2020, doi: 10.1109/JETCAS.2020.3015509. (Year: 2020).*

S. Bansal et al., "Design of configurable power efficient 2-dimensional crossbar switch for network-on-chip(NoC)," 2016 IEEE International Conference on Recent Trends in Electronics, Information & Communication Technology (RTEICT), Bangal, India, 2016, pp. 1514-1517, doi: 10.1109/RTEICT.2016.7808085. (Year: 2016).*

B. K. Monika, S. K. Amaresha and S. S. Yellampalli, "ASIC implementation of switch architecture used in NoC," 2017 International Conference on Smart Technologies for Smart Nation (SmartTechCon), Bengaluru, India, 2017, pp. 758-761, doi: 10.1109/SmartTechCon.2017.8358473. (Year: 2017).*

(56) References Cited

OTHER PUBLICATIONS

K. Ishii and S. Namiki, "Toward exa-scale photonic switch system for the future datacenter (invited paper)," 2016 Tenth IEEE/ACM International Symposium on Networks-on-Chip (NOCS), Nara, Japan, 2016, pp. 1-5, doi: 10.1109/NOCS.2016.7579337. (Year: 2016).*

J. Deng et al., "NPFONoC: A Low-loss, Non-blocking, Scalable Passive Optical Interconnect Network-on-Chip Architecture," 2019 Asia-Pacific Signal and Information Processing Association Annual Summit and Conference, Lanzhou, China, 2019, pp. 1443-1448, doi: 10.1109/APSIPAASC47483.2019.9023169. (Year: 2019).*

A. Ejaz and I. Sourdis, "FastTrackNoC: A NoC with FastTrack Router Datapaths," 2022 IEEE International Symposium on High-Performance Computer Architecture (HPCA), Seoul, Korea, Republic of, 2022, pp. 971-985, doi: 10.1109/HPCA53966.2022.00075. (Year: 2022).*

D. Kim, K. Kim, J. -Y. Kim, S. -J. Lee and H. -J. Yoo, "Solutions for Real Chip Implementation Issues of NoC and Their Application to Memory-Centric NoC," First International Symposium on Networks-on-Chip (NOCS'07), Princeton, NJ, USA, 2007, pp. 30-39, doi: 10.1109/NOCS.2007.40. (Year: 2007).*

X. Wang and J. Nurmi, "Comparing Two Non-Blocking Concurrent Data Switching Schemes for Network-on-Chip," EUROCON 2007—The International Conference on "Computer as a Tool", Warsaw, Poland, 2007, pp. 2587-2592, doi: 10.1109/EURCON.2007.4400549. (Year: 2007).*

P. P. B.M., K. Parane and B. Talawar, "High-Performance NoCs Employing the DSP48E1 Blocks of the Xilinx FPGAs," 20th International Symposium on Quality Electronic Design (ISQED), Santa Clara, CA, USA, 2019, pp. 163-169, doi: 10.1109/ISQED.2019.8697444. (Year: 2019).*

A. Bhanwala, M. Kumar and Y. Kumar, "FPGA based design of low power reconfigurable router for Network on Chip (NoC)," International Conference on Computing, Communication & Automation, Greater Noida, India, 2015, pp. 1320-1326, doi: 10.1109/CCAA.2015.7148581. (Year: 2015).*

M. Shahiri, M. Valinataj and A. M. Rahmani, "A reliable and high-performance Network-on-Chip router through decoupled resource sharing," 2016 International Conference on High Performance Computing & Simulation (HPCS), Innsbruck, Austria, 2016, pp. 88-95, doi: 10.1109/HPCSim.2016.7568320. (Year: 2016).*

X. Zhao, S. Ma, Z. Wang, N. E. Jerger and L. Eeckhout, "CD-Xbar: A Converge-Diverge Crossbar Network for High-Performance GPUs," in IEEE Transactions on Computers, vol. 68, No. 9, pp. 1283-1296, Sep. 1, 2019, doi: 10.1109/TC.2019.2906869. (Year: 2019).*

N. Enright Jerger, M. Lipasti and L. -S. Peh, "Circuit-Switched Coherence," in IEEE Computer Architecture Letters, vol. 6, No. 1, pp. 5-8, Jan. 2007, doi: 10.1109/L-CA.2007.2. (Year: 2007).*

P. Anuradha et al., "Enhancing High-Speed Data Communications: Optimization of Route Controlling Network on Chip Implementation," in IEEE Access, vol. 12, pp. 123514-123528, 2024, doi: 10.1109/ACCESS.2024.3427808. (Year: 2024).*

Chris Fallin, et al., "Chipper: A Low-complexity Bufferless Deflection Router", Proceedings of the IEEE International Symposium on High Performance Computer Architecture (HPCA), 2011, 13 pages.

Nachiket Kapre, et al, "Hoplite: Building Austere Overlay NoCs for FPGAs", Xilinx. Downloaded on May 6, 2020 at 19:46:57 UTC from IEEE Xplore, 8 pages.

Nachiket Kapre, et al., "Hoplite: A Deflection-Routed Directional Torus NoC for FPGAs", ACM Transactions on Reconfigurable Technology and Systems, vol. 1, No. 2, Article 3, Publication date: Apr. 2016, 24 pages.

Min Chae Yang, et al., "MRBS: An Area-Efficient Multicast Router for Network-on-Chip using Buffer Sharing", DOI 10.1109/ACCESS.2021.3137218, IEEE Access, vol. 4, 2016, 11 pages.

SmartConnect v1.0, LogiCORE IP Product Guide, Vivado Design Suite, PG247 Feb. 3, 2020, 55 pages.

* cited by examiner

LOCALIZED AND RELOCATABLE SOFTWARE PLACEMENT AND NOC-BASED ACCESS TO MEMORY CONTROLLERS

TECHNICAL FIELD

This disclosure relates to localized and relocatable software placement for network-on-chip (NoC) based access of the software to memory controllers.

BACKGROUND

Modern integrated circuits (ICs) implement applications that require movement of large quantities of data. Such ICs typically include high-bandwidth interfaces. Not only must the ICs move large quantities of data, but the ICs must do so with reduced latency. A data processing array, for example, may be used to implement one or more machine learning applications. Each of the applications executing in the data processing array may require low latency and uniform accesses to memory, high-bandwidth memory connections, and/or deterministic memory access times.

To help meet some of the data demands outlined above, ICs have started to incorporate a network structure referred to as a "network-on-chip" or "NoC." A NoC is capable of routing packets of data between different endpoint circuits and/or subsystems of an IC. System-on-Chips (SoCs), programmable ICs such as field programmable gate arrays (FPGAs), programmable logic devices (PLDs), and application-specific ICs (ASICs) are different examples of ICs that may include a NoC. A NoC meets some, but not all, of the above-noted application requirements. For example, a NoC does provide a low-latency mechanism for moving large amounts of data between various endpoint circuits on the IC.

SUMMARY

In one or more example implementations, a system includes a plurality of processing elements. The system includes a plurality of memory controllers. The system includes a network on chip (NoC) providing connectivity between the plurality of processing elements and the plurality of memory controllers. The NoC includes a sparse network coupled to the plurality of processing elements and a non-blocking network coupled to the sparse network and the plurality of memory controllers. The plurality of processing elements execute a plurality of applications. Each application has a same deterministic memory access performance in accessing associated ones of the plurality of memory controllers via the sparse network and the non-blocking network of the NoC.

The foregoing and other implementations can each optionally include one or more of the following features, alone or in combination. Some example implementations include all the following features in combination.

In some aspects, one or more of the plurality of processing elements includes a group of one or more columns of array tiles of a data processing array, wherein each column includes one or more compute tiles.

In some aspects, one or more of the plurality of processing elements is implemented using programmable logic.

In some aspects, one or more of the plurality of processing elements is a hardened circuit block.

In some aspects, the non-blocking network includes a plurality of crossbars. Each crossbar couples the sparse network to a subset of the plurality of memory controllers.

In some aspects, each processing element is communicatively linked to a selected crossbar of the plurality of crossbars through a vertical connection of the sparse network. Each vertical connection linking each processing element to the selected crossbar has a same latency.

In some aspects, the sparse network is a blocking network that includes a plurality of interconnected switches. Each processing element is communicatively linked to one or more selected memory controllers of the plurality of memory controllers through a same number of the interconnected switches.

In some aspects, each crossbar is configured to provide a same latency for data conveyed from any input port to any output port of the crossbar.

In some aspects, each crossbar of the non-blocking network selectively couples a processing element of the plurality of processing elements above the crossbar with at least one memory controller of the subset of the plurality of memory controllers coupled thereto.

In some aspects, one or more of the plurality of memory controllers is a high-bandwidth memory controller.

In some aspects, a selected application is re-mapped from a first processing element of the plurality of processing elements to a second processing element of the plurality of processing elements without changing the deterministic memory access performance of the application.

In some aspects, a memory association of the selected application is changed based on the re-mapping.

In some aspects, a region of memory accessed by a selected application is re-mapped to a different region of the memory without changing the deterministic memory access performance of the application.

In some aspects, the different region of the memory is accessed by a different memory controller of the plurality of memory controllers.

In one or more example implementations, a method includes executing, by a plurality of processing elements, a plurality of applications. The method includes submitting, from the plurality of applications, memory access requests to a plurality of memory controllers. The method includes routing the memory access requests through a NoC to the plurality of memory controllers. The NoC includes a sparse network coupled to the plurality of processing elements and a non-blocking network coupled to the sparse network and the plurality of memory controllers. The routing conveys the memory access requests through the sparse network and the non-blocking network of the NoC to different ones of the plurality of memory controllers with a same deterministic memory access performance for each memory access request.

The foregoing and other implementations can each optionally include one or more of the following features, alone or in combination. Some example implementations include all the following features in combination.

In some aspects, the sparse network is a blocking network that includes a plurality of interconnected switches and each processing element is communicatively linked to a selected memory controller of the plurality of memory controllers through a same number of the interconnected switches.

In some aspects, the non-blocking network includes a plurality of crossbars, each crossbar coupling the sparse network to a subset of the plurality of memory controllers.

In some aspects, the method includes re-mapping a selected application from a first processing element of the plurality of processing elements to a second processing element of the plurality of processing elements without changing the deterministic memory access performance of the application. It should be appreciated that the re-mapping may include remapping a selected application from one, two, or more first processing elements to one, two, or more second processing elements without changing the deterministic memory access performance of the application.

In some aspects, the method includes changing a memory association of the selected application based on the re-mapping.

In some aspects, the method includes re-mapping a region of memory accessed by a selected application to a different region of the memory without changing the deterministic memory access performance of the application.

In some aspects, the re-mapping operations described herein may be performed while retaining the security context of the respective processing elements subsequent to any re-mapping.

In some aspects, the method includes configuring a portion of the NoC to couple the selected application with the different region of the memory using a different memory controller of the plurality of memory controllers.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
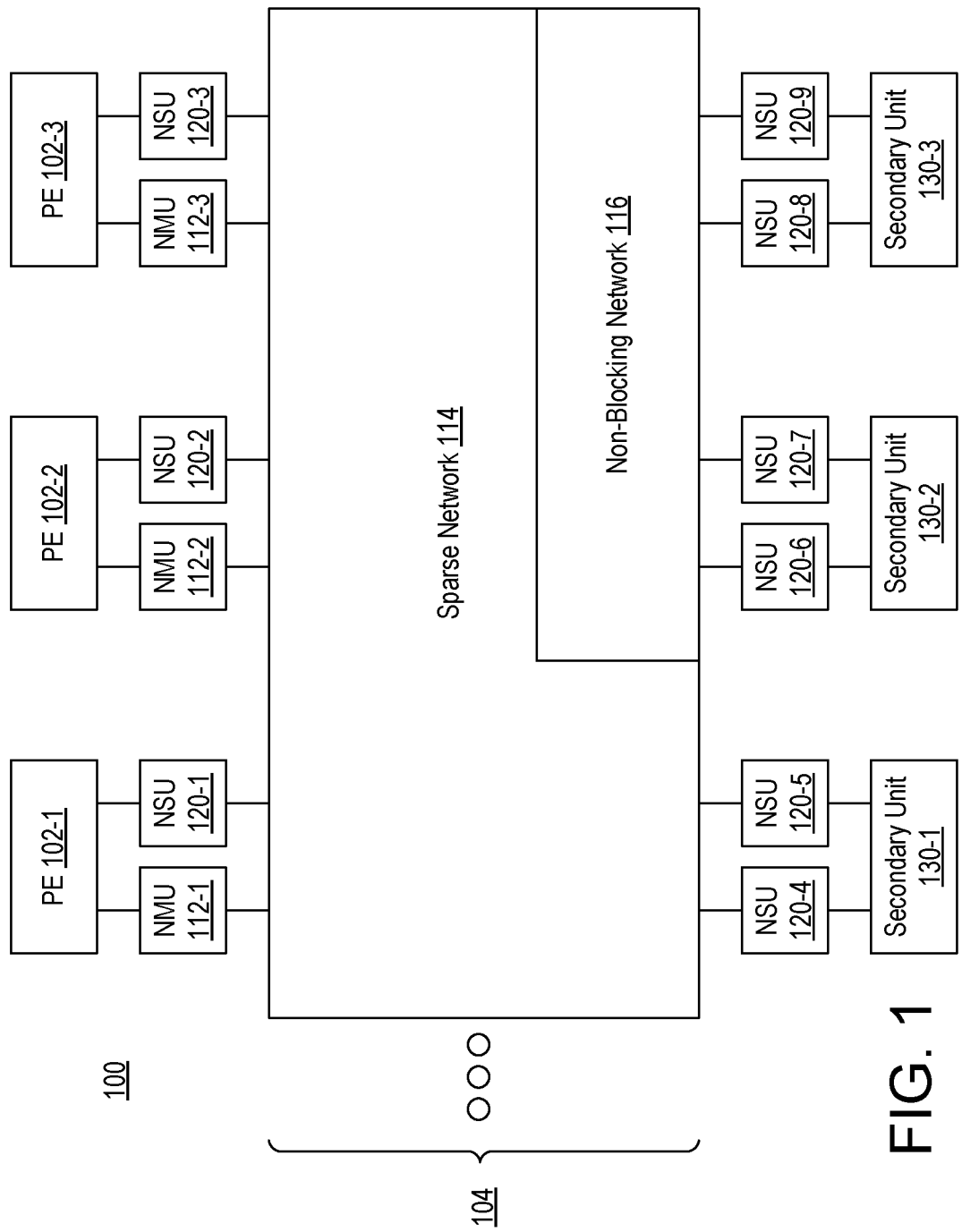
FIG. 1 is a block diagram of an example integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to localized and relocatable software placement for network-on-chip (NoC) based access of the software to memory controllers. In accordance with the inventive arrangements described within this disclosure, methods and systems are provided that facilitate localized and relocatable software placement among different processing elements of an integrated circuit (IC). The example implementations described within this disclosure also facilitate access by the applications, as implemented in the processing elements, to memory controller(s) via a NoC.

In one or more example implementations, a system such as an IC includes a NoC that is used to communicatively link processing elements with one or more memory controllers. The processing elements may be implemented as portions of a data processing array, hardened circuits, circuits implemented using programmable logic, or any combination thereof. Each processing element is capable of running or executing a different application. The application may be embodied as program code executable by various types of processing units, as configuration data that configures a portion of programmable logic, and/or configuration data that configures a hardened circuit block. For example, one processing element may execute a CNN application, while another processing element executes an RNN application independently of the CNN application. In another example, the different applications may be different, independent instances of a same application.

The NoC includes a sparse network and a non-blocking network. The sparse network couples to the processing elements while the non-blocking network couples to the memory controllers. The sparse network is coupled to the non-blocking network. Each of the applications executing in the processing elements may be closely associated with a particular region of memory that is accessible by selected one(s) of the memory controllers. For example, each memory controller is capable of accessing a particular region of the memory defined by an address aperture. The address aperture of the memory controller may be closely associated with a particular processing element executing an application.

The circuit architectures described herein allow applications running on a group of one or more processing elements to be re-mapped. Mapping, or re-mapping, refers to the location or assignment of an application to a particular group of one or more processing elements and/or the association of a region of memory to the application. In accordance with the inventive arrangements, application re-mapping may be performed where an application is relocated from one processing element to another processing element and/or the application is associated with a different region of memory without causing any change or difference in the performance of the application in terms of memory accesses. That is, the latency of memory accesses directed to the memory from the applications remains constant or unchanged despite any re-mapping performed. This ability to remap applications while retaining the same performance facilitates efficient usage of the processing elements and efficient memory usage. Moreover, the application(s) may be configured with interleaved access to multiple memory controllers while maintaining a same level of performance in terms of memory accesses via the NoC.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram of an IC 100. In one aspect, IC 100 is implemented within a single IC package. For example, IC 100 may be implemented using a single die disposed in a single IC package. In another example, IC 100 is implemented using two or more interconnected dies disposed within a single IC package.

IC 100 includes a NoC 104. NoC 104 includes a sparse network 114 and a non-blocking network 116, according to an example. In one aspect, IC 100 includes only hardened circuitry in an Application Specific IC (ASIC). In another aspect, IC 100, which may be a System-on-Chip (SoC), includes a mix of hardened and programmable circuitry. Programmable circuitry may include programmable logic. In the example of FIG. 1, NoC 104 may be formed using hardened circuitry rather than programmable circuitry so that its footprint in IC 100 is reduced.

As shown, NoC 104 interconnects processing elements (PEs) 102 and secondary units 130. PEs 102 can include programmable logic blocks or hardened processors. That is, NoC 104 can be used in IC 100 to permit different hardened or programmable circuit elements in IC 100 to communicate. For example, PE 102-1 may use one NoC Master Unit (NMU) 112 (e.g., an ingress logic block) to communicate with secondary unit 130-1. Although shown as being connected to one NMU 112, PEs 102 can couple to multiple NMUs 112. In either case, in another aspect, PE 102-1 may use the same NMU 112-1 to communicate with multiple secondary units 130 (assuming these endpoints use the same communication protocol). During configuration, a compiler determines the data paths PEs 102 use in NoC 104 to communicate with secondary units 130 and/or other PEs 102. That is, the paths may be set before NoC 104 begins to operate and do not change unless NoC 104 is reconfigured. Thus, each time PE 102-1 transmits data to secondary unit 130-2, it will use the same path through NoC 104, until NoC 104 is reconfigured.

To route the data, NoC 104 includes sparse network 114 and non-blocking network 116 which have connections between themselves and the ingress logic blocks (e.g., NMUs 112) and egress logic blocks (e.g., NoC Slave Units (NSUs) 120). Sparse network 114 may be implemented as a blocking network. Non-blocking network 116, as its name suggests, may be implemented as a non-blocking network. As mentioned above, some hardware elements, e.g., secondary units 130-2 and 130-3 such as High Bandwidth Memory (HBM) or Double Data Rate Random Access Memory (RAM) (hereafter "DDR") operate more efficiently at higher bandwidths than other hardware elements. To provide additional benefits to the secondary units 130-2 and 130-3, NoC 104 includes non-blocking network 116 that serves as an interface between secondary units 130-2 and 130-3 and the rest of NoC 104, e.g., sparse network 116.

In another aspect, non-blocking network 116 comprises switching elements (e.g., crossbars) that provide full, non-blocking connections between inputs into, and outputs from, non-blocking network 116. That is, an input into non-blocking network 116 has access to any output of non-blocking network 116. In contrast, sparse network 114 does not guarantee non-blocking input/outputs. As a result, sparse network 114 may not provide as much bandwidth to the connected PEs 102 and secondary unit 130-1 as non-blocking network 116, but the density of the switching elements in sparse network 114 may be lower which means it may require less area in IC 100 and have a reduced cost when compared to a non-blocking network.

In the example of FIG. 1, not all secondary units 130 can efficiently use the additional benefits provided by non-blocking network 116. For example, secondary unit 130-1 may be programmable logic or a slower memory system, while secondary unit 130-2 may be an HBM system and secondary unit 130-3 is a DDR (e.g., DDR5) memory system. As shown, secondary unit 130-1 is attached to sparse network 114 while secondary units 130-2 and 130-3 are attached to non-blocking network 116. Thus, a connection in NoC 104 between two PEs 102, or between a PE 102 and secondary unit 130-1 may be located solely within sparse network 114. In contrast, a connection between a PE 102 and one of secondary units 130-2 or 130-3 includes both sparse network 114 and non-blocking network 116.

While NoC 104 can be configured to permit PEs 102 to communicate with all the other hardware logic blocks that are also connected to NoC 104, in other examples, PEs 102 may communicate with only a sub-portion of the other hardware logic blocks (e.g., other PEs and the secondary units 130) connected to NoC 104. For example, for one configuration of NoC 104, PE 102-1 may be able to communicate with PE 102-2 but not with PE 102-3, or with only a subset of the secondary units 130. However, NoC 104 may be reconfigured such that PE 102-1 has established communication paths in NoC 104 with all these hardware elements.

In another aspect, IC 100 is a Field Programmable Gate Array (FPGA) that configures PEs 102 according to a user design. That is, in this example, the FPGA includes both programmable and hardened logic blocks. However, in other examples, IC 100 is an ASIC that includes only hardened logic blocks. That is, IC 100 may not include programmable logic (PL) blocks in which case PEs 102 are hardened processors or processing circuits. Even though in that example the logic blocks are non-programmable, NoC 104 may still be programmable to switch between different communication protocols, change data widths at the interface, or adjust its operational frequency.

Figure 2:
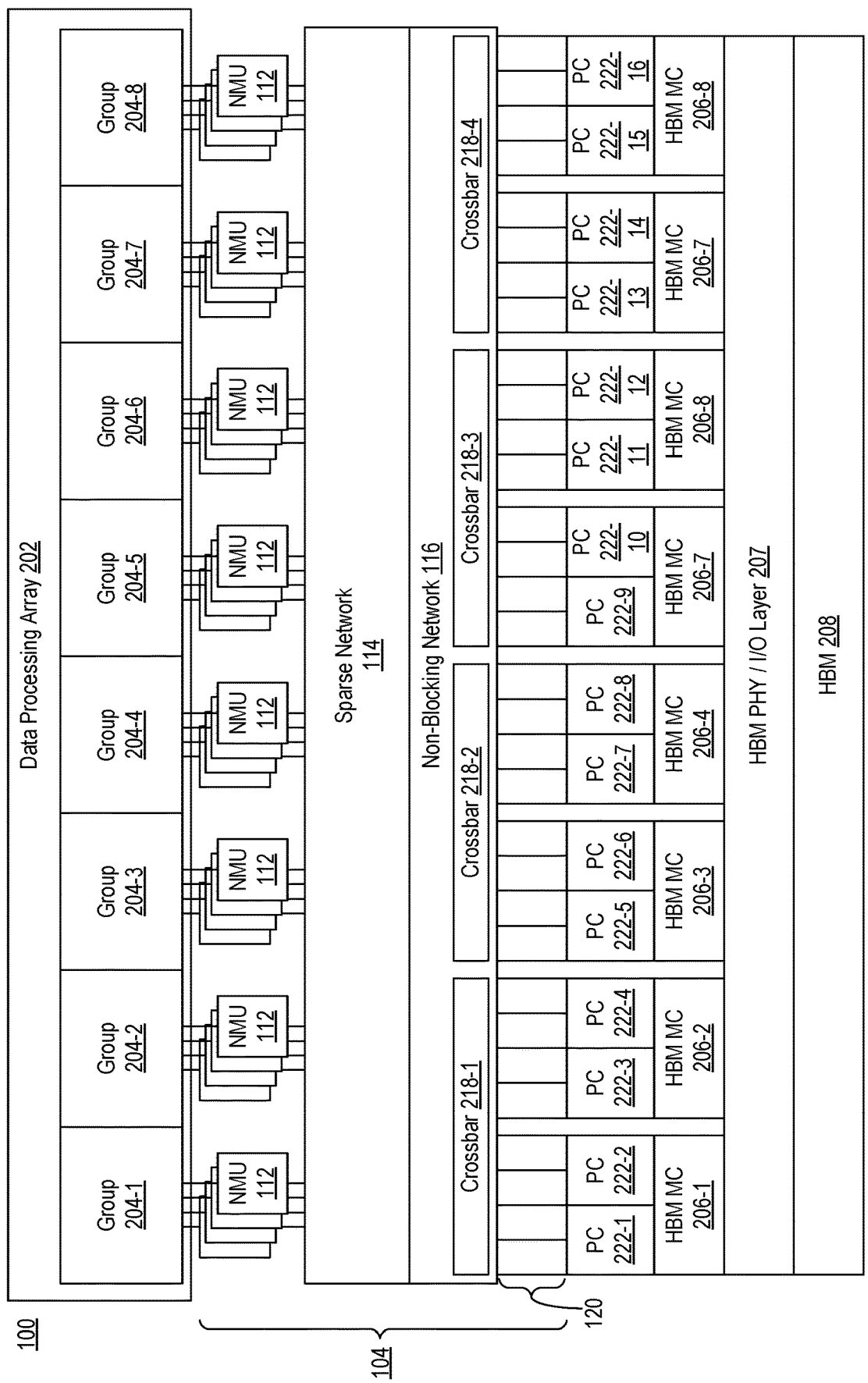
FIG. 2 illustrates another example of the IC of FIG. 1.

FIG. 2 illustrates another example of IC 100. For purposes of illustration, FIG. 2 may illustrate only a portion of IC 100. In the example of FIG. 2, IC 100 includes a data processing array 202, NoC 104, and a plurality of memory controllers. The memory controllers may access a memory. In the example of FIG. 2, the memory is an HBM 208 and the memory controllers are HBM memory controllers (HBM MCs) 206. HBM memory controllers 206 may access HBM 208 via an HBM physical (PHY) and input/output (I/O)

layer 207. HBM 208 may be implemented on a same die as the surrounding circuitry, in a different die, and/or in a different IC package. In the example of FIG. 2, data processing array 202 may replace one or more of PEs 102. The HBM stack may replace one or more of secondary units 130-2 and/or 130-3.

Data processing array 202 is formed of a plurality of circuit blocks referred to as tiles. As defined within this disclosure, the term "array tile" means a circuit block included in a data processing array 202. Array tiles of data processing array 202 may include only compute tiles and interface tiles. Optionally, one or more memory tiles may be included in data processing array 202. The array tiles are hardened and are programmable. Data processing array 202 may include an array interface that includes the interface tiles. An interface tile is a circuit block included in data processing array 202 that communicatively links compute tiles and/or memory tiles of data processing array 202 with circuits outside of data processing array 202, whether such circuits are disposed in the same die, a different die in the same IC package, or external to the IC package. An example implementation of data processing array 202 is described herein in connection with FIG. 17.

As illustrated, the array tiles of data processing array 202 are organized into a plurality of groups 204. Each group 204 includes one or more columns of array tiles. Each column includes one or more compute tiles. Each column also may include an interface tile and optionally one or more memory tiles. Each group 204 of array tiles is capable of executing an application. Thus, data processing array 202 is capable of executing 8 different applications in the example of FIG. 1. It should be appreciated that the number of groups 204 shown is for purposes of illustration. Data processing array 202 may be organized into fewer or more groups, where each group is capable of executing an application independently of each other group. In the example of FIG. 2, each group 204 of data processing array 202 may be considered a different PE 102 corresponding to FIG. 1.

As discussed, NoC 104 is a programmable interconnecting network for sharing data between endpoint circuits in an IC. The endpoint circuits can be disposed in data processing array 202, may be HBM memory controllers 206, and/or other subsystems of IC 100 (not shown). In an example, NoC 104 includes one or more horizontal paths, one or more vertical paths, or both horizontal and vertical path(s).

In the example of FIG. 2, interface tiles of data processing array 202 in each column of array tiles of groups 204 may be communicatively linked to NoC 104 via NMUs 112. NMUs 112 couple interface tiles of data processing array 202 with sparse network 114. Non-blocking network 116 is formed of a plurality of switching circuits shown as crossbars 218. In the example, each crossbar 218 is coupled to two NSUs 120.

Non-blocking network 116 is operative as an interface between HBM memory controllers 206 and the rest of NoC 104, i.e., sparse network 114. Crossbars 218 are configured to provide full, non-blocking connections between inputs into, and outputs from, non-blocking network 116. That is, an input into non-blocking network 114 has access to any output of non-blocking network 116. By comparison, sparse network 114 does not guarantee non-blocking input/outputs. As a result, sparse network 114 may not provide as much bandwidth to the connected endpoint circuits as non-blocking network 116, but the density of the switching elements in sparse network 114 may be lower which means that sparse network 114 may require less area in IC 100 and have a reduced cost when compared to a non-blocking network implementation.

In the example, it should be appreciated that while HBM memory controllers 206 are coupled to non-blocking network 116 and, therefore, communicate with data processing array 202 via non-blocking network 116 and sparse network 114, other subsystems may connect to sparse network 114. That is, in some cases, the endpoint circuits that communicate via NoC 104 may do so solely through sparse network 114 without using non-blocking network 116.

In the example, each set of two NSUs 120 are coupled to a corresponding and single pseudo channel (PC) 222. Each HBM memory controller 206 is coupled to two PCs 222. Non-blocking network 116 serves as a localized interconnect between sparse network 114 and PCs 222, HBM memory controllers 206, and HBM PHY and I/O layer 207.

In the example, multiple independent HBM memory controllers 206 feed into one HBM memory stack (e.g., HBM 208). For example, one HBM2E stack can have up to eight HBM memory controllers 206. Each HBM memory controller 206 may be divided into two PCs 222. Each PC 222 is connected to one or two NoC channels (e.g., NSUs 120) to support the desired bandwidth. In one example, HBM2E devices run at 3200 Mbps and each have 16 PCs where each PC can support up to 25.6 GBps of bandwidth. Depending upon the specific NoC frequency, 1-2 channels of 128-bit data in NoC 104 can be used to sustain HBM PC bandwidth. Moreover, multiple different groups 204 can connect to multiple HBM memory controllers 206. In the example, crossbars 218 'localize' NoC traffic to respective PCs 222. This allows sparse network 114 to do the 'heavy-lifting' of traffic routing in NoC 104 while crossbars 218 route the traffic to specific locations (i.e., NSUs 120 coupled to the HBM stack).

Figure 3:
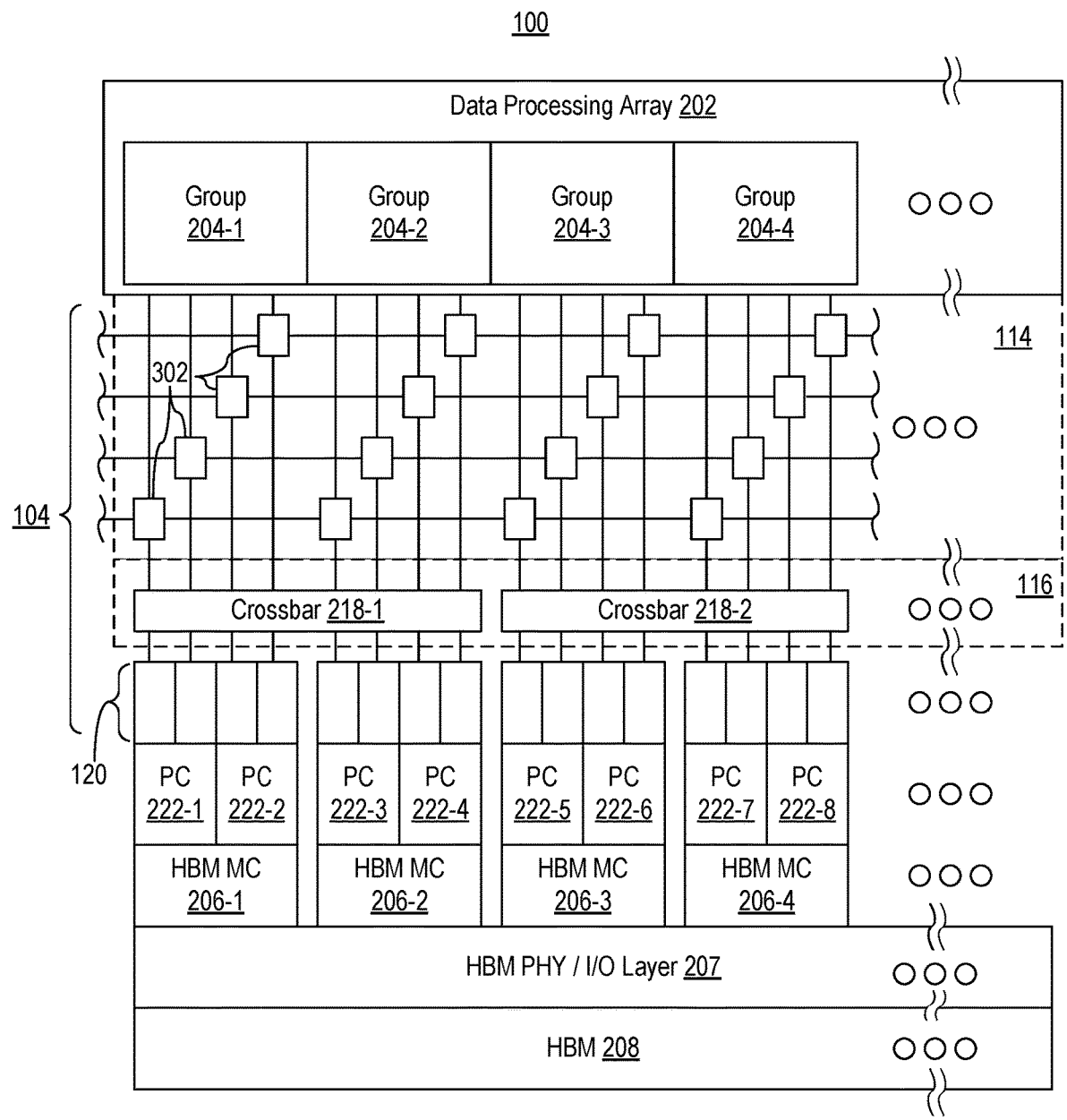
FIG. 3 illustrates another example of the IC of FIG. 1 showing a network-on-chip (NoC) in greater detail.

FIG. 3 illustrates another example of IC 100 showing greater detail in NoC 104. For purposes of illustration, FIG. 3 may illustrate only a portion of IC 100. In the example of FIG. 3, sparse network 114 includes a plurality of interconnected switches 302. Switches 302 may not guarantee non-blocking connections where any input into sparse network 114 can communicate with any output of sparse network 116. While this reduces the bandwidth provided by sparse network 116, it also reduces the cost and footprint of NoC 104 in IC 100. For many hardware elements connected to NoC 104, the bandwidth provided by the interconnected switches 302 is sufficient.

In the example, crossbars 218 may be implemented as 8×8 crossbars. Each crossbar 218 is capable of providing a full, non-blocking connection to PCs 222 (which can also be referred to as HBM PC ports). In the example of FIGS. 2 and 3, each HBM memory controller 206 has two PCs 222 that share the same address space. That is, the two PCs 222 connected to the same HBM memory controller 206 share the address space corresponding to the connected HBM memory controller 206. PCs 222 are in turn coupled to respective NSUs 120 which provide access to non-blocking network 116.

In one or more examples, sparse network 114 and non-blocking network 116 use the same NoC protocol to transmit data. However, when the data leaves (egresses from) NoC 104 to an external hardware element such as PCs 222, NSUs 120 convert the data from the NoC protocol to the HBM protocol (e.g., an Advanced extensible Interface (AXI) protocol such as AXI-memory mapped (AXI-MM)). Another conversion process is performed when data is transferred from an NMU 112 (not shown in FIG. 3) into sparse network 114. For example, NMUs 112 may convert data from an Advanced extensible Interface (AXI) protocol into the NoC protocol.

Figure 4:
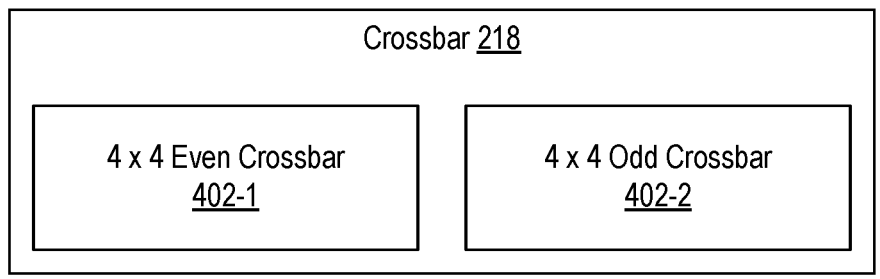
FIG. 4 is a block diagram illustrating an example of a crossbar of the NoC.
Figure 5:
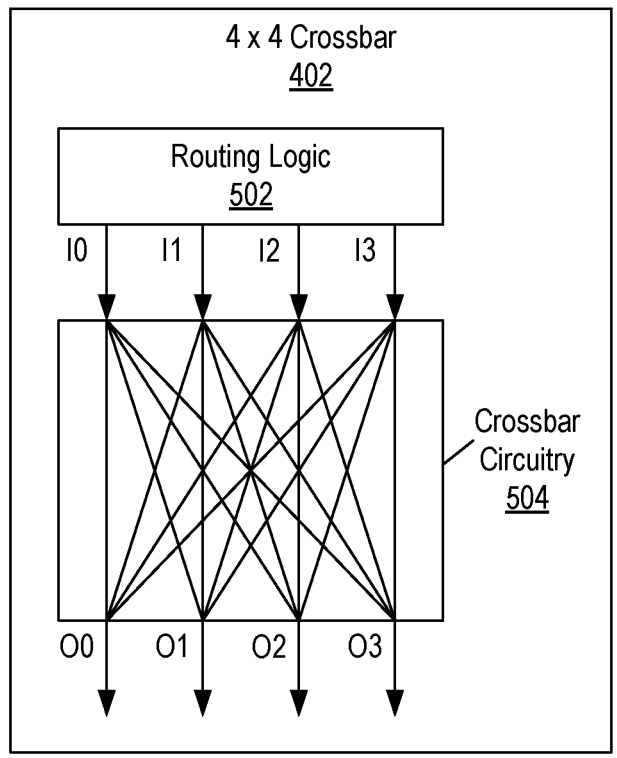
FIG. 5 illustrates the non-blocking operation of a crossbar.

As shown, crossbars 218 include eight inputs and eight outputs. Crossbars 218 permit data to be transferred from sparse network 114 into PCs 222, and eventually into HBM PHY/IO layer 207. In response, crossbars 218 also permit data to be transferred from PCs 222 into sparse network 114 and eventually to NMUs 112 and to data processing array 202. In one or more examples, crossbars 218 are non-blocking so that an input can access all the outputs (or a subset of the outputs as shown in FIGS. 4 and 5). That is, an input may not need to access all of the outputs, in which case crossbars 218 can be fully non-blocking even if an input does not have the ability to use all eight of the outputs of crossbar 218.

Crossbars 218 are capable of 'localizing' NoC traffic to respective PCs 222. This allows sparse network 114 to do route the majority of data traffic (e.g., perform the 'heavy-lifting' of traffic routing) in NoC 104 while crossbars 218 route the traffic to specific locations (i.e., NSUs 120 coupled to the HBM stack). Thus, each crossbar 218 is capable of localizing traffic across eight PCs 222. In one example, each NoC channel is designed to be 128-bit wide (e.g., at 1 GHz) in which case two NoC channels can support each PC 222.

FIG. 4 is a block diagram illustrating an example of a crossbar 218. As discussed, crossbar 218 may be implemented as an 8×8 crossbar. As pictured, crossbar 218 is divided into two 4×4 crossbars 402-1 and 402-2. Specifically, crossbar 218 includes a 4×4 even crossbar 402-1 and a 4×4 odd crossbar 402-2.

Two ports coming out of each PC 222 target the same address. Such ports are defined as 'even' and 'odd' ports and are used for load balancing at an HBM boundary. As such, crossbar 218 can be divided into two true 4×4 crossbars 402 (which can also be referred to as crossbar switches). That is, there is no advantage in this HBM implementation to enable the even ports to communicate with the odd ports, and vice versa. Even crossbar 402-1 only connects to even ports of a PC 222 and odd crossbar 402-2 only to odd ports. This eliminates the need for any horizontal routing/connections between the even and odd crossbars 402. Stated differently, in this implementation of crossbar 218, data does not flow between crossbars 402-1 and 402-2. This optimization of crossbar 218 permits the logic in crossbar 218 to be reduced relative to that of an 8×8 crossbar implementation where each input can communicate with all eight outputs rather than only the even inputs of even crossbar 402-1 being able to communicate with the even outputs of even crossbar 402-1 and the odd inputs of odd crossbar 402-2 being able to communicate with the odd outputs of odd crossbar 402-2. This may reduce the overall footprint of crossbar 218.

Although the example of FIG. 4 is not a "true" crossbar, it is nonetheless a non-blocking crossbar since the inputs do not need to access all eight of the inputs in an HBM implementation. That is, the even inputs only need access to the even outputs and the odd inputs only need access to the odd outputs. However, in other examples, crossbar 218 may be implemented using a true 8×8 crossbar circuit architecture where each input can access all eight outputs.

In an example, crossbar 218 is a static implementation and may not have routing table/address translation logic like switches 302 of sparse network 114. This means that the NoC compiler does not need to route packets until the packets reach the HBM input ports and only needs to route packets to the best possible location at the input of a crossbar 218. In one aspect, in the example of FIG. 4, the even and odd crossbars 402 append two additional bits to the address information coming from input packets into crossbar 218 and route the packets accordingly. The response data received from the HBM stack follows the same path as through crossbar 218 using the two bits. The two bits are dropped from the response as the packet comes out of crossbar 218 and is routed through sparse network 114 in NoC 104.

FIG. 5 illustrates an example implementation of the crossbar illustrated in FIG. 4. That is, FIG. 5 illustrates an implementation of the even and odd crossbars 402 described in connection with FIG. 4. FIG. 5 illustrates the non-blocking attribute of the 4×4 crossbar 402 by way of crossbar circuitry 504 where any input (I0-I3) can access any output (O0-O3). Further, the 4×4 crossbar 402 includes routing logic 502 for appending the two bits in the address information of received packets (either data received from sparse network 114, or response data received from the HBM stack) to route the packets through 4×4 crossbar 402 and out of crossbar 218 of FIGS. 2, 3, and 4.

The architecture discussed above improves congestion in a hardened NoC for localized HBM traffic and reduces the number of switches required to connect all HBM ports from every NoC physical channel. The connection topology reduces horizontal NoC latency significantly (which is provided by the sparse network), improves power consumption, and improves memory efficiency, specifically in case of HBM interleaved access. This also helps in reducing compiler complexity when configuring the NoC.

Figure 6:
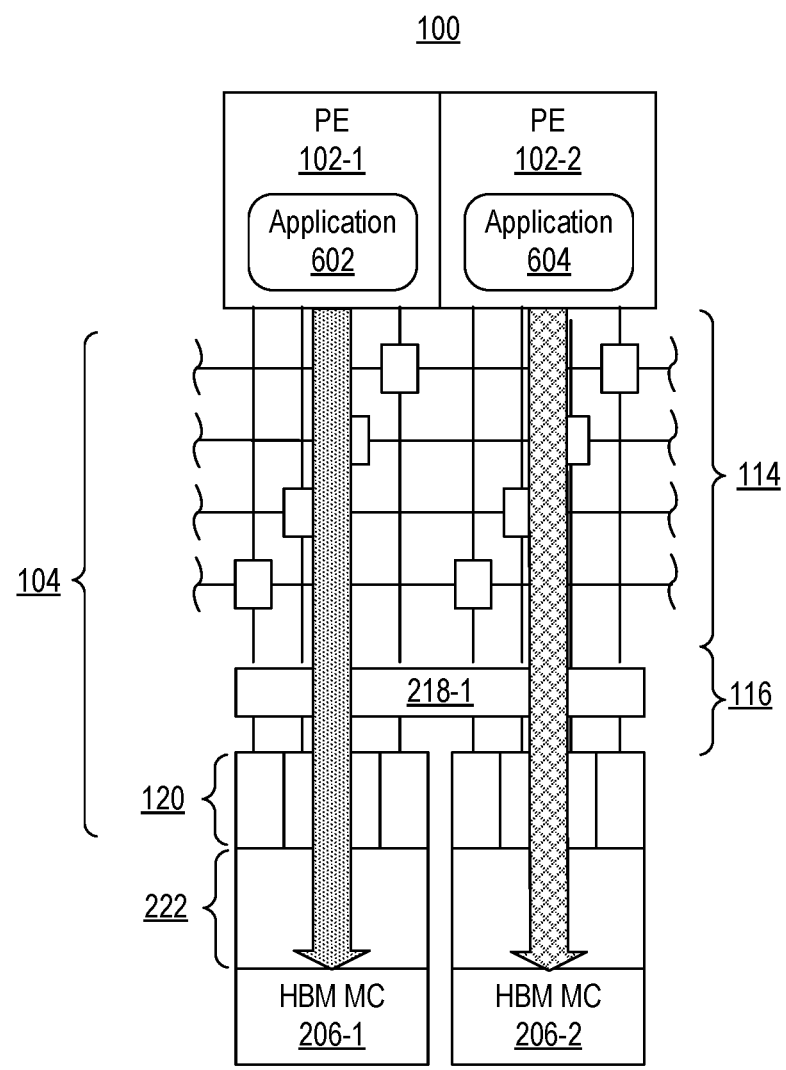
FIG. 6 illustrates an example mapping of applications to an example circuit architecture.

FIG. 6 illustrates an example mapping of applications to the circuit architecture of IC 100. In the example, application 602 is mapped to PE 102-1 and application 604 to PE 102-2. Application 602 is capable of accessing HBM memory controller 206-1 via a vertical data path through sparse network 114 and by way of crossbar 218-1. Similarly, application 602 is capable of accessing HBM memory controller 206-2 via a different vertical path through sparse network 114 and by way of crossbar 218-1.

As an illustrative and nonlimiting example, PE 102-1 may represent group 204-1, while PE 102-2 represents group 204-2. In another example, PE 102-1 may represent a hardened circuit block while PE 102-2 represents a different hardened circuit block. In that case, applications 602, 604 may represent configuration data for the respective hardened circuit blocks. In still another example, PE 102-1 may represent a first portion of programmable logic while PE 102-2 represents a second and different portion of programmable logic. In that case, applications 602, 604 may represent configuration data specifying applications (e.g., circuit designs) that are run by the respective portions of programmable logic.

The data path through sparse network 114 for each of applications 602, 604 may traverse through a same and predetermined number of switches 302. In the example of FIG. 6, each vertical data path of an application executing in a PE 102 to a crossbar 218 may traverse one switch 302 such that each data path from a group 204 to a crossbar 218 has the same latency. This latency is deterministic (e.g., known a priori).

Since each crossbar 218 provides the same latency from any input port to any output port, both of the data paths through sparse network 114 and non-blocking network 116 for each of applications 602, 604 will be the same and be deterministic (e.g., known).

In the example of FIG. 6, each PE 102 may execute an application that may require localized memory accesses. For example, application 602 and application 604 may require read and write access to a region of HBM 208 (or DDR). In the example of FIG. 6, each PE 102 has a close affinity with the HBM memory controller 206 located below that PE 102. For example, PE 102-1 has a close affinity with HBM memory controller 206-1. PE 102-2 has a close affinity with HBM memory controller 206-2, etc. This affinity, or connectivity, provides sufficient bandwidth requirements for the application executed by each respective PE 102. The application(s) and any configuration data for NoC 104 may be part of a user design loaded into IC 100.

Figure 7:
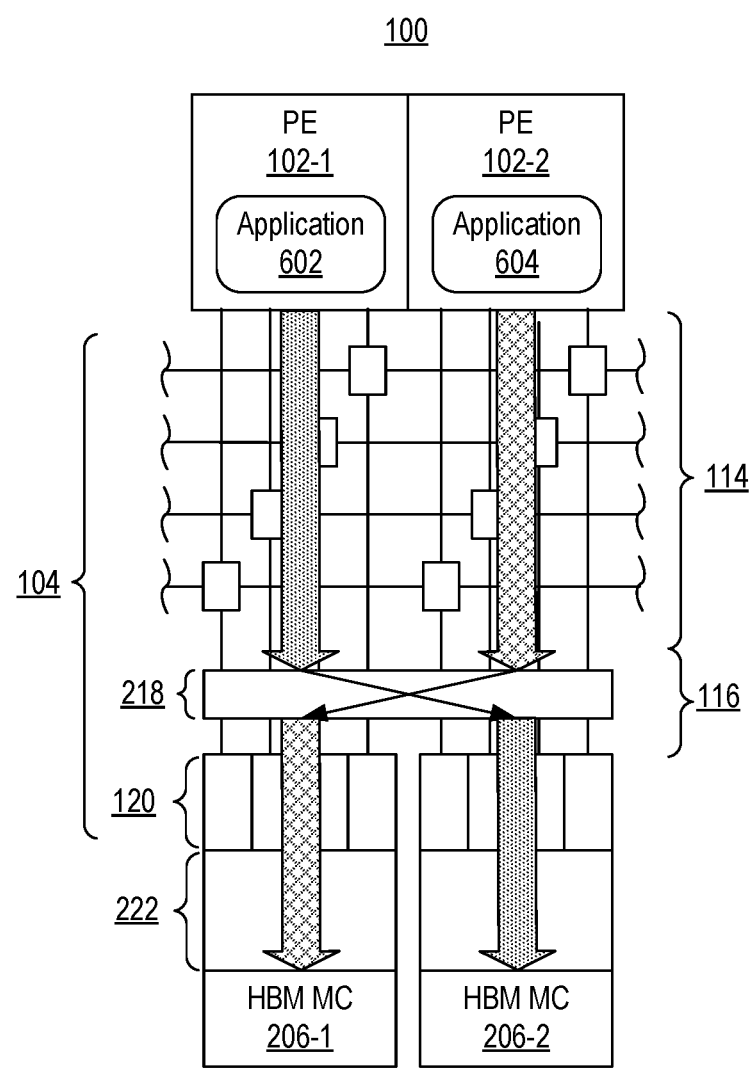
FIG. 7 illustrates another example mapping of applications to the example circuit architecture.

FIG. 7 illustrates another example mapping of applications to the circuit architecture of IC 100. In one or more examples, each PE 102 may, based on the configuration of crossbar 218 located below the respective PE 102, access either of the HBM memory controllers 206 (e.g., or DDR memory controllers as the case may be) connected to that same crossbar 218. Such is the case even though the group may continue to utilize the same vertical connection through sparse network 114. For example, PE 102-1 is capable of accessing HBM memory controller 206-1 or HBM memory controller 206-2 based on the configuration of crossbar 218-1, while the data path through sparse network 114 that connects PE 102-1 to crossbar 218-1 remains unchanged regardless of whether PE 102-1 and the application executed therein communicates with HBM memory controller 206-1 or HBM memory controller 206-2. Similarly, PE 102-2 is capable of accessing HBM memory controller 206-1 or HBM memory controller 206-2 based on the configuration of crossbar 218-1, while the data path through sparse network 114 that connects PE 102-2 to crossbar 218-1 remains unchanged. PE 102-1 and PE 102-2, however, may utilize separate data paths through sparse network 114.

In the example of FIG. 7, applications 602, 604 have been re-mapped to access different memory controllers by reconfiguring crossbar 218 within non-blocking network 116. No reconfiguration of sparse network 114 need be performed to achieve the remapping of applications 602, 604 from the example of FIG. 6 to FIG. 7. In performing the re-mapping, e.g., the association of regions of memory to applications, it should be appreciated that any data that is utilized by application 602 may be relocated from the region of HBM 208 corresponding to HBM memory controller 206-1 to the region of HBM 208 corresponding to HBM memory controller 206-2.

Figure 8:
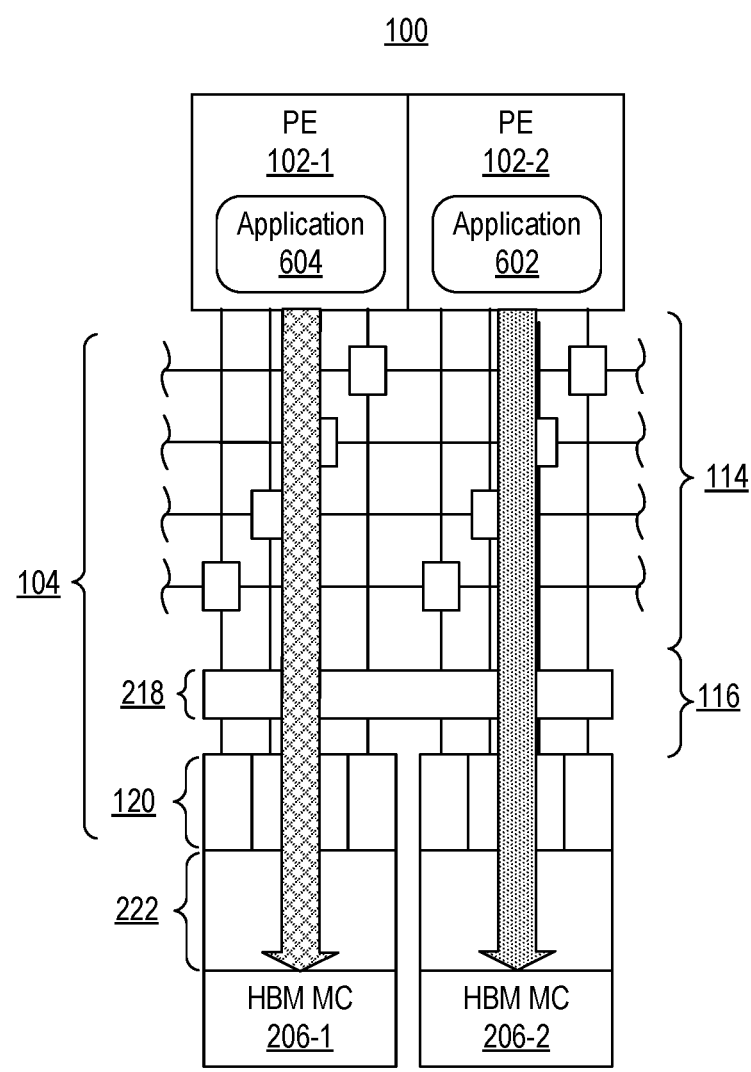
FIG. 8 illustrates another example mapping of applications to the example circuit architecture.

FIG. 8 illustrates another example mapping of applications to the circuit architecture of IC 100. In the example of FIG. 8, application 604 is re-mapped to PE 102-1 and application 602 is re-mapped to PE 102-2. Further, PE 102-1 accesses HBM memory controller 206-1 while PE 102-2 accesses HBM memory controller 206-2. In performing re-mapping from the example of FIG. 7 to that of FIG. 8, applications 602 and 604 are relocated. Further, the configuration of crossbar 218 is changed. As discussed, the data paths from each of PEs 102-1 and 102-2 through sparse network 114 need not be changed.

The example of FIG. 8 illustrates that the application executing in a particular PE 102 may be relocated to a different PE 102. In one aspect, the application may continue to access the same region of memory by accessing the same memory controller both before and after the relocation. As pictured, application 602 is relocated from PE 102-1 to PE 102-2. Application 602, once relocated, may continue to access the same region of HBM 208 via HBM memory controller 206-2 (the same region as compared to the example of FIG. 7). Subsequent to the relocation, however, application 602 may use the data path through sparse network 114 that was previously used by application 604 (e.g., the data path of PE 102-2). The configuration of crossbar 218-1 allows the application as executed by PE 102-2 to continue to access HBM memory controller 206-1 and the same region of HBM 208.

In the examples, the data paths through sparse network 114 that connect different ones of PEs 102 to non-blocking network 116 may be vertical paths through sparse network 114 that traverse a same or predetermined number of switches. In one example, each vertical path connecting a PE 102 to a crossbar 218 may include one such switch. For example, a vertical path through sparse network 114 may be established from an NMU 112 through one switch 302 to an NSU 120 in the same vertical line.

As noted, each crossbar provides uniform latency (e.g., delay) from any input to any output. Thus, in each of the foregoing examples corresponding to FIGS. 5-8, the latency of memory accesses by the application(s) 602, 604 and/or PEs 102 to HBM memory controllers 206 remains unchanged through any of the re-mapping operations illustrated. That is, each application has a same deterministic memory access performance in accessing associated ones of the plurality of memory controllers via the sparse network and the non-blocking network of the NoC in consequence of the mapping and/or re-mapping described. As defined within this disclosure, the term "memory access performance" means the time required for a memory access request to traverse from the issuer (e.g., a PE 102) to a destination (e.g., a memory controller). Further, in this regard, it should be appreciated that an application may be moved from group 204-1, for example, to group 204-3, which connects to crossbar 218-2 and may use either HBM memory controller 206-3 and/or HBM memory controller 206-4 depending on the configuration of crossbar 218-2 with the same deterministic memory access performance.

In one or more other example implementations, by adjusting the number of switches 302 that are used within sparse network 114 in establishing a data path between a PE 102 and a crossbar 218, the performance of the architecture illustrated herein can be adjusted by extending the horizontal NoC connectivity, which extends the affinity of PEs 102 to memory controllers. For example, by permitting some amount of horizontal movement in sparse network 114 that may utilize additional switches 302 (that may still be kept constant among the different groups 204), an application may access an HBM memory controller 206 that is connected to a crossbar 218 not immediately below the group 204 (e.g., a larger number of memory controllers). As an illustrative and nonlimiting example, an application executing in group 204-1 may access HBM memory controller 206-3 and/or 206-4. Thus, the example implementations described herein are scalable.

Figure 9:
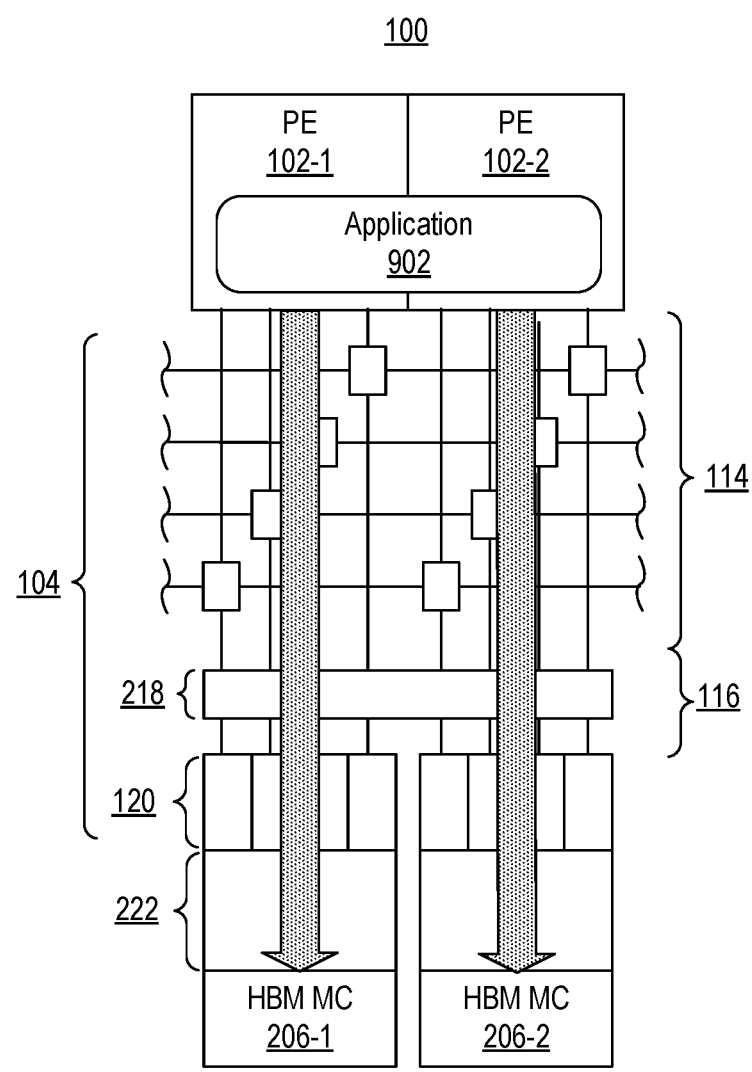
FIG. 9 illustrates an example where an application is implemented using multiple processing elements.

FIG. 9 illustrates an example where an application 902 is implemented using groups 204-1 and 204-2. In the example, application 902 utilizes two vertical paths through sparse network 114 to crossbar 218 and further utilizes both of HBM memory controllers 206-1 and 206-2. The example of FIG. 9 illustrates the case where application 902 has a higher bandwidth requirement that may require support access from more than one HBM memory controller 206. In such cases, the interconnect may support interleaved access across multiple HBM memory controllers 206.

Figure 10:
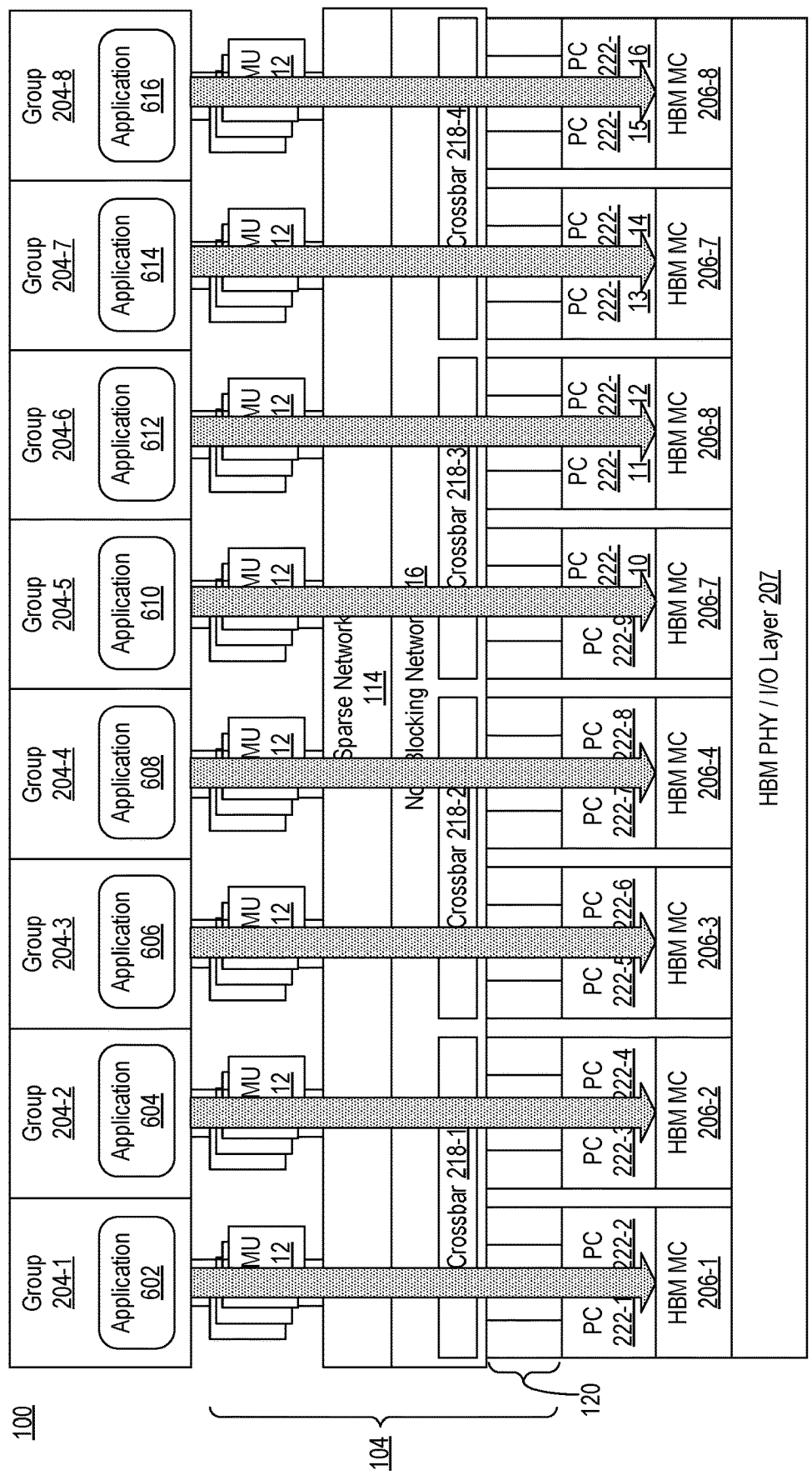
FIG. 10 illustrates another example mapping of applications to the example circuit architecture.

FIG. 10 illustrates another example mapping of applications to the example circuit architecture of IC 100. In the examples of FIGS. 10-13, same shading is used to illustrate the data paths taken by each group/application shown. In the example, for purposes of illustration, each group 204 includes four PEs. Groups 204 execute applications 602, 604, 606, 608, 610, 612, 614, and 616, where each group 204 executes a different one of the applications. In the example of FIG. 10, the PEs may be implemented as any of the variety of different PEs described herein, whether implemented as hardened circuit blocks, column(s) of the data processing array 202, and/or circuits implemented in programmable logic. In the example, as each of applications 602-616 executes using a same number of PEs and utilizes a same number of NMUs to access NoC 104, the application(s), whether individually or in different combinations, may be re-mapped to different groups 204 across the PEs therein. As noted, moving the applications does not affect or change the deterministic performance of the applications once re-mapped and executed.

In one or more aspects, in performing any re-mapping, the security context of the various groups 204 of PEs may be maintained subsequent to the re-mapping. The examples described herein illustrate various examples of multi-tenancy implementations. Each group 204, for example, may have a defined security context for the tenant (e.g., application) executed by the group. The security context (e.g., security settings such as isolation settings) for the groups 204 may be maintained at the software level so that any boundaries between groups that prevent one group from accessing data of another group (e.g., crossing a group boundary), may be prevented. Such isolation may be preserved within NoC 102 among data streams for different groups. Each group may be considered an independently executing or self-contained thread of execution. Thus, the security contexts may create groups 204 of PEs, seclude the groups 204 from one another, and prevent data leakage from one group to another. The security context may remain with the group though applications are re-mapped.

Figure 11:
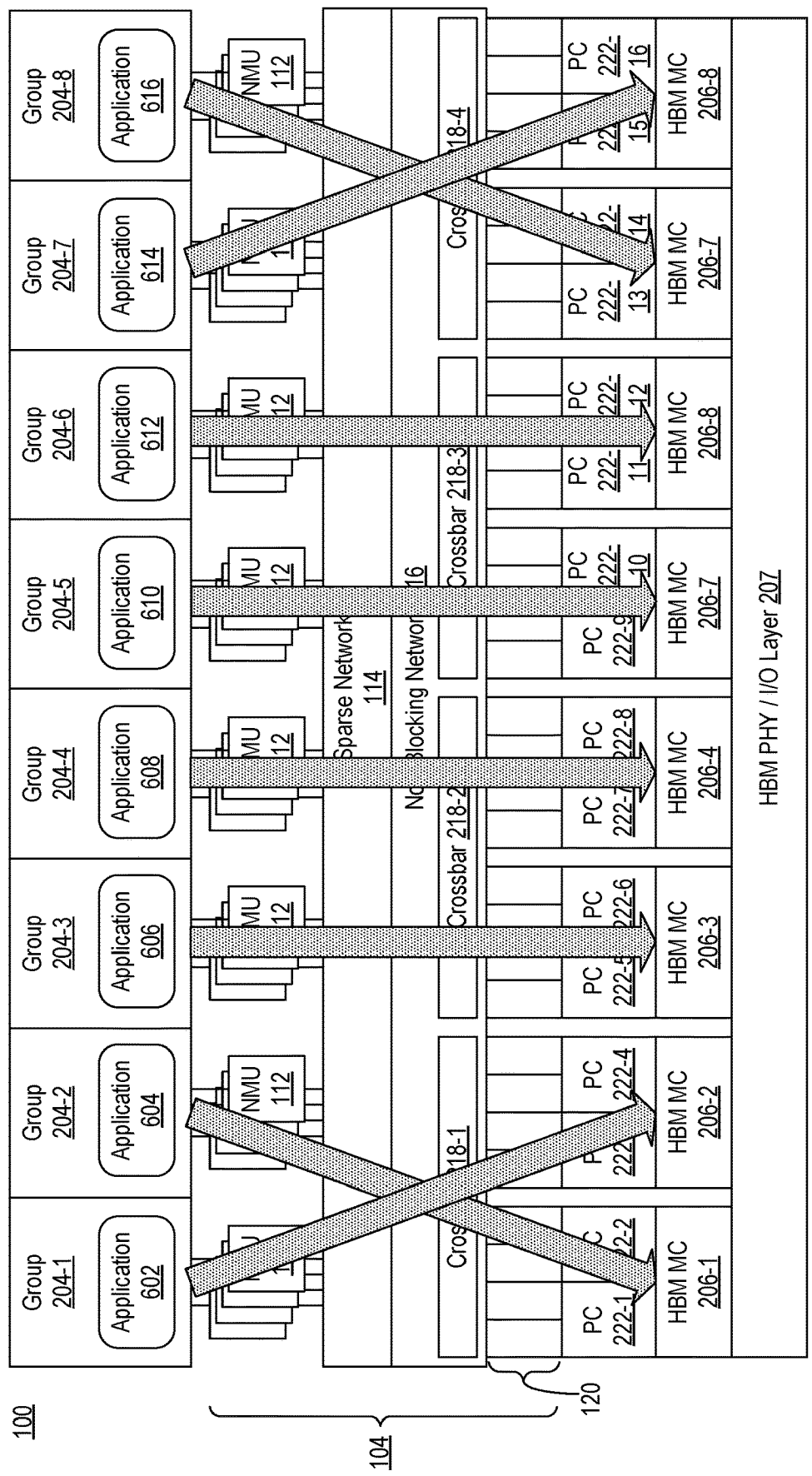
FIG. 11 illustrates another example mapping of applications to the example circuit architecture.

FIG. 11 illustrates another example mapping of applications to the example circuit architecture of IC 100. In the example of FIG. 11, application 602 is re-mapped to use HBM memory controller 206-2 (instead of HBM memory controller 206-1 from FIG. 10) and application 604 is re-mapped to use HBM memory controller 206-1 (instead of HBM memory controller 206-2 from FIG. 10). Similarly, application 614 is re-mapped to use HBM memory controller 206-8 (instead of HBM memory controller 206-7 from FIG. 10) and application 616 is re-mapped to use HBM memory controller 206-7 (instead of HBM memory controller 206-8 from FIG. 10). In the example, other applications such as applications 606, 608, 610, and 612 may remain with the same mapping illustrated in FIG. 10. The example of FIG. 11 illustrates that some applications may be re-mapped while others are not.

Still, in one or more other examples, applications may be moved across one or more (e.g., multiple) crossbars 218.

Figure 12:
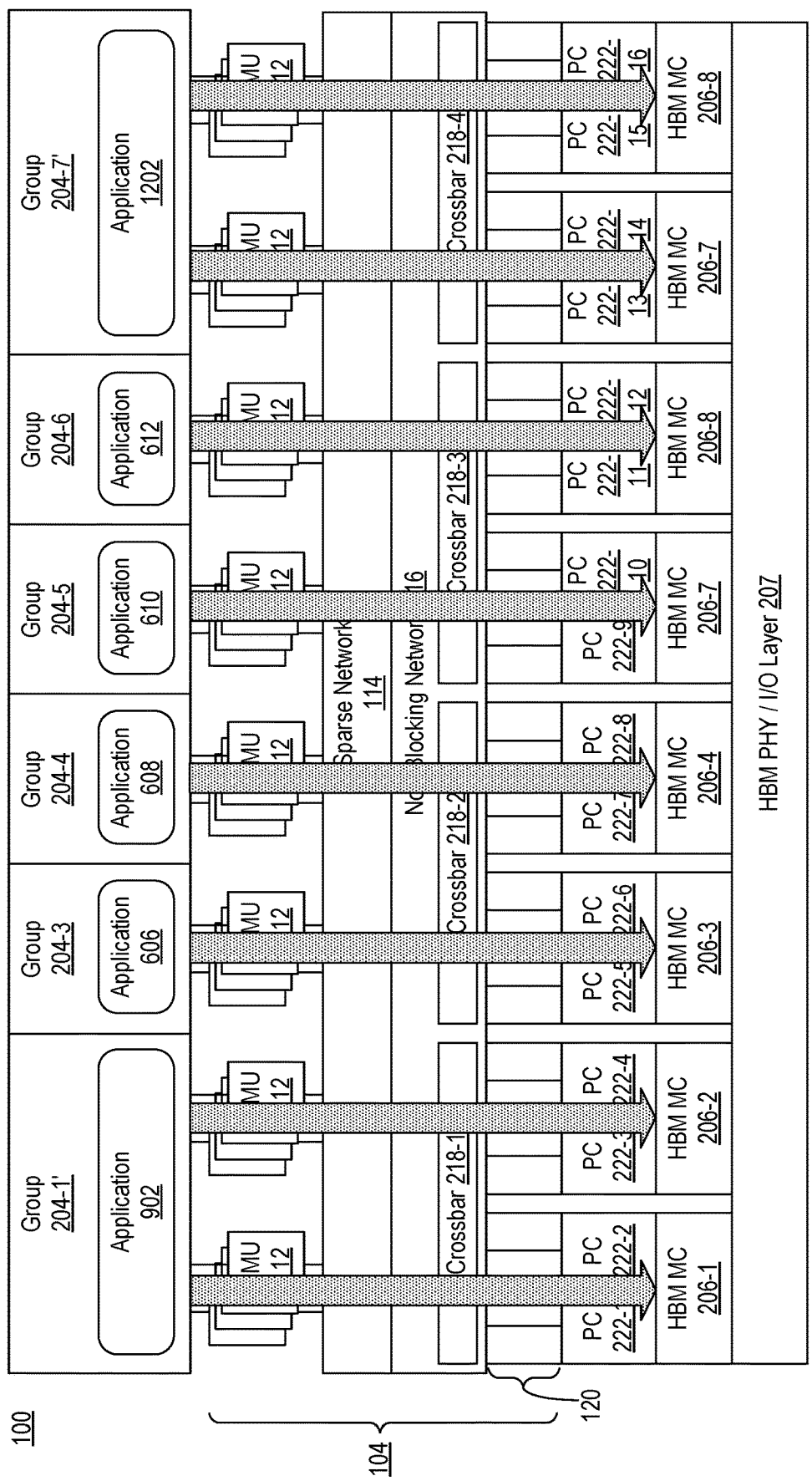
FIG. 12 illustrates another example mapping of applications to the example circuit architecture.

FIG. 12 illustrates another example mapping of applications to the example circuit architecture of IC 100. In the example of FIG. 12, application 902 utilizes eight PEs with groups 204-1 and 204-2 being merged into a single, larger group 204-1'. Similarly, application 1202 utilizes eight PEs with groups 204-7 and 204-8 being merged into a single, larger group 204-7'.

In the example of FIG. 12, application 902 and application 904 may be re-mapped to one another's group. That is, application 902 may be re-mapped to group 204-7' while application 1202 is re-mapped to group 204-1' as both groups have same size (e.g., same number of PEs and/or NMUs). As discussed, the security context of each of groups 204-1' and 204-7' may be preserved after the applications are re-mapped.

Similarly, any one of applications 608-612 or combinations thereof may be re-mapped among groups 204-3, 204-4, 204-5, and 204-6 as groups 204-3, 204-4, 204-5, and 204-6 are the same size (e.g., same number of PEs and/or NMUs). The security context of each of groups 204-3, 204-4, 204-5, and 204-6 may be preserved after the applications are re-mapped. It should be appreciated that re-mapping may be performed among applications 902 and 1202 only, among one or more of applications 606-612 only, or among both applications 902 and 1202 and among one or more of applications 606-612.

Figure 13:
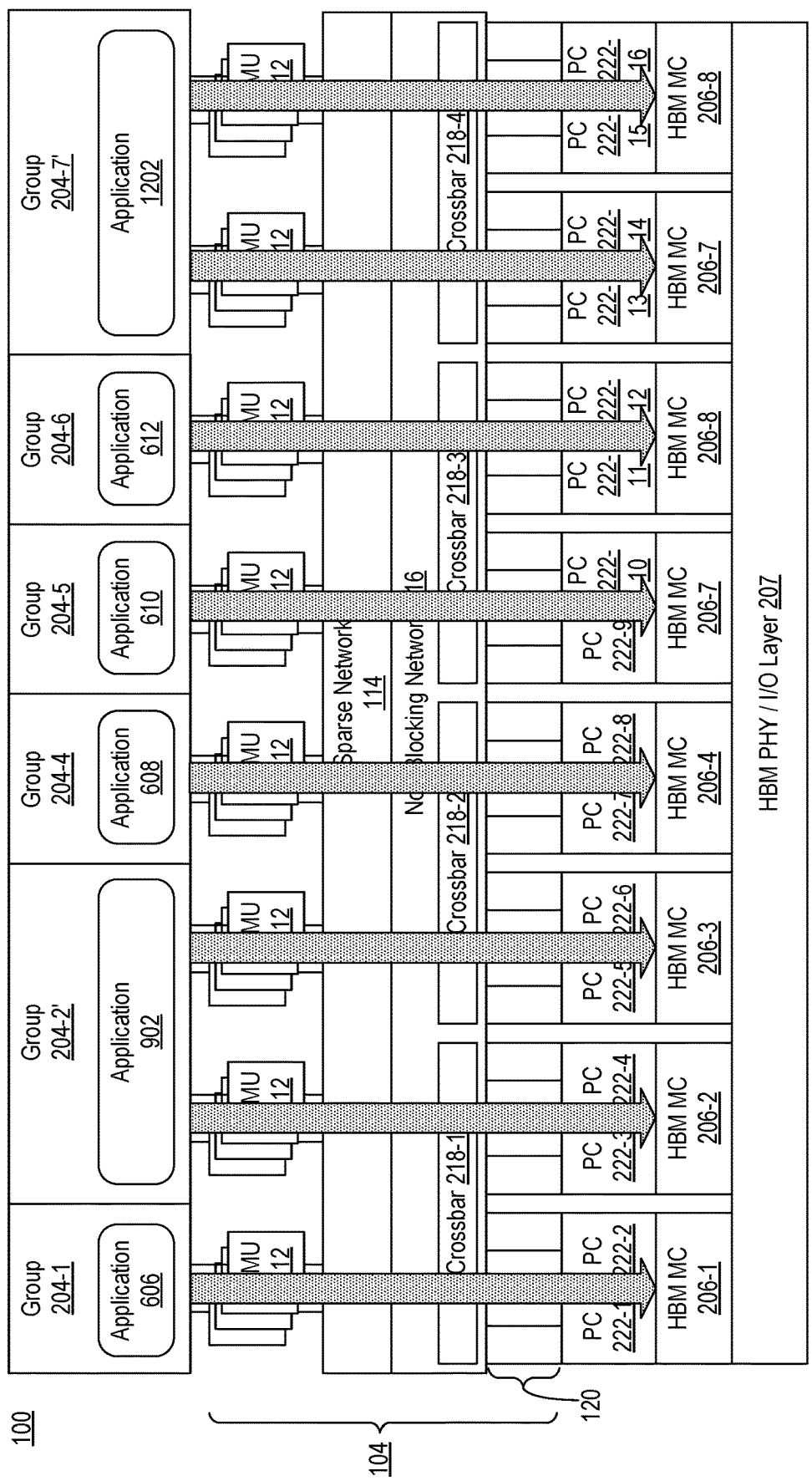
FIG. 13 illustrates another example mapping of applications to the example circuit architecture.

FIG. 13 illustrates another example mapping of applications to the example circuit architecture of IC 100. In the example of FIG. 13, different groups are defined where groups 204-2 and 204-3 are merged into a single, larger group 204-2' to which application 902 is re-mapped. In the example, application 1202 may be re-mapped to group 204-2', while application 902 may be re-mapped to group 204-7'. The example of FIG. 13 illustrates how an application may be mapped and/or re-mapped to span a crossbar boundary. That is, as mapped, application 1202 uses only crossbar 218-4. Subsequent to re-mapping to group 204-2', application 1202 utilizes a portion of crossbar 218-1 and a portion of crossbar 218-2. Similarly, as shown application 902 utilizes a portion of crossbar 218-1 and a portion of cross-bar 218-2. Subsequent to re-mapping to group 204-7', application 902 uses only crossbar 218-4.

In each of the re-mapping examples described herein (e.g., with reference to FIGS. 6-13), applications may be re-mapped and executed with the same deterministic performance that the application had prior to the re-mapping. Further, the security context of the group(s) may be preserved subsequent to any re-mapping. The examples illustrate flexibility in re-mapping applications across multiple crossbars and mixing and matching patterns of NMUs. This flexibility allows system designers to optimize hardware usage based on usage context.

Figure 14:
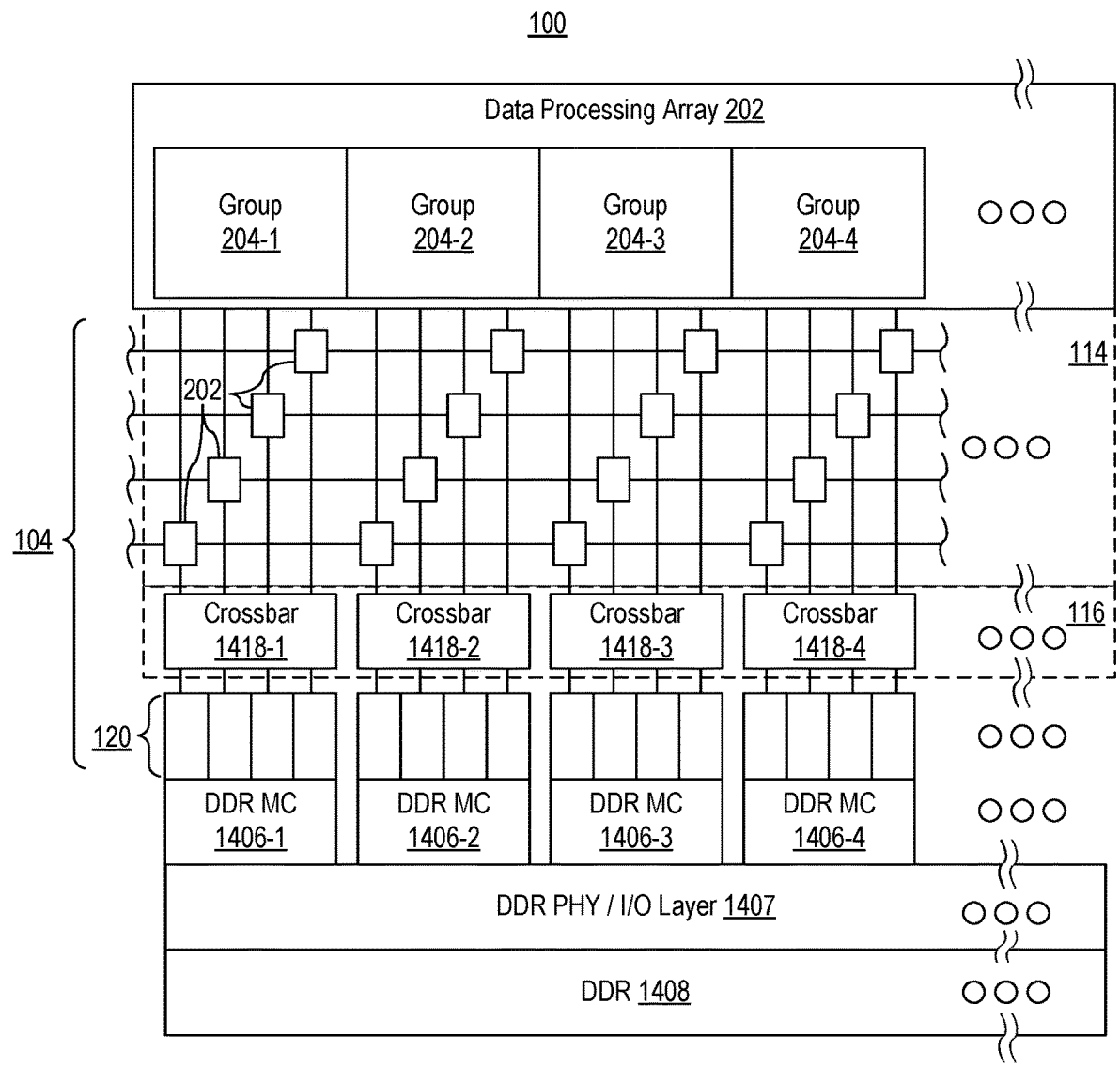
FIG. 14 illustrates another example of the IC of FIG. 1 where the NoC is coupled to a Double Data Rate (DDR) memory infrastructure.

FIG. 14 illustrates an example of IC 100 where NoC 104 is coupled to a DDR memory infrastructure. For purposes of illustration, only a portion of IC 100 is illustrated. As shown, NSUs 120 are coupled to DDR memory controllers 1006. FIG. 10 is similar to the example of FIGS. 2 and 3 with the exception that non-blocking network 116 is optimized for connecting a DDR memory stack (e.g., a DDR5 memory stack) rather than an HBM stack. In the example of FIG. 14, non-blocking network 116 includes crossbars 1418. Crossbars 1418 may be implemented as 4×2 crossbars that localize NoC traffic to respective DDR memory controllers 1406 (also referred to as DDR controller ports). Like above, the architecture of FIG. 14 permits switches 302 in sparse network 114 to do the heavy lifting of routing data in NoC 104 while the localized crossbars 1418 (which can also be referred to as crossbar switches) route the traffic to specific NSUs 120 connected to the DDR5 stack (e.g., DDR PHY/ I/O layer 1407 which couples to DDR 1408).

In the example of FIG. 14, non-blocking network 116 localizes traffic across two DDR channel ports. Each DDR memory controller 1406 is connected to at least one NSU 120, which translates NoC protocol to, for example, AXI-MM which is used by the DDR stack. In one example, each NoC channel is designed to be 128-bit wide (e.g., at 1 GHZ). Hence two NoC channels support each DDR memory controller 1406. The two ports exiting each DDR memory controller 1406 may target the same address in ×32 mode.

Like the example of FIGS. 3 and 4, in one or more other examples, crossbars 1418 are a static implementation and do not have routing table/address translation logic like switches 302 in sparse network 114. This means that the NoC compiler does not need to route packets until arriving at the DDR input ports and only routes packets to the best possible location at the input of the crossbars 1418.

Figure 15:
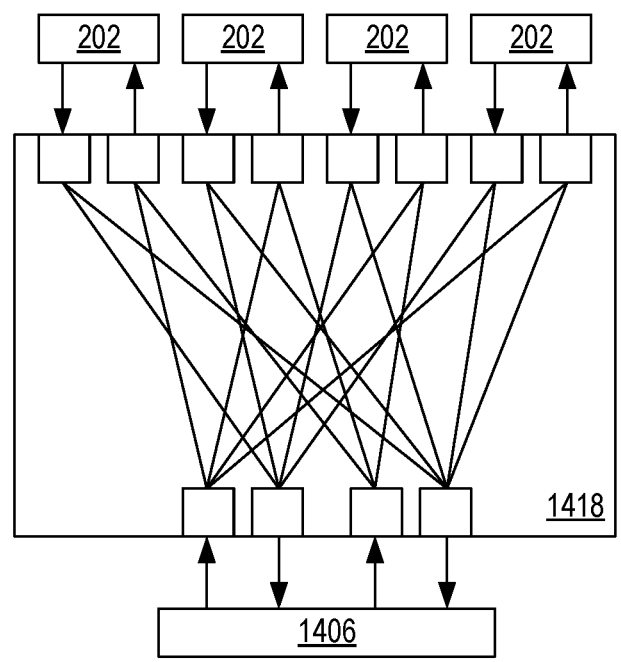
FIG. 15 is an example implementation of a crossbar of FIG. 10.

FIG. 15 is an example implementation of crossbar 1418 of FIG. 14. In the example of FIG. 15, crossbar 1418 is optimized for top to bottom traffic and routes the data received from the four switches 302 to either of the two ports of the DDR memory controller 1408. Crossbar 1418 is connected to all four physical channels of switches 302 in sparse network 114, which allows access for ×16 mode to each DDR port.

Crossbar 1418 can also support virtual channel (VC) requirements for DDR memory controller 1406. There are three levels of request VC priority support: LL (Low Latency), ISOC (Isochronous) and BE (Best Effort). In one aspect, instead of a route table lookup, crossbar 1418 can use destination-ID matching to one of the two destination-IDs for DDR ports (corresponding to the two NSUs 120). DDR request tokens can be specified as per five request VCs: LLR/ISR/BER/ISW/BEW. Crossbar 1418 can support four request ports with five VCs each, and 3 levels of priority. In contrast, DDR response tokens can be specified as per four response VCs (two response ports with four VCs each, and two levels of priority).

The NoC architecture discussed above can improve congestion on a hardened NoC for localized DDR traffic and reduce the number of switches required to connect to all DDR5 ports from every NoC physical channel. The connection topology reduces horizontal NoC latency significantly (in the sparse network), improves power consumption, provides more VC support per DDR port, and improves memory efficiency specifically in case of DDR interleaved access. This also helps in reducing compiler complexity when configuring the NoC.

It should be appreciated that the examples of re-mapping applications described within this disclosure and in connection with FIGS. 6-13 may be implemented with the examples of FIGS. 14 and 15 using a DDR stack. That is, re-mapping may be performed by relocating applications and/or associating data and by reconfiguring paths through non-blocking network 116 in the case of an IC that utilizes a DDR stack. Further, the groups may represent any of the different varieties of PEs described herein in any combination through data processing array 202 is illustrated.

Figure 16:
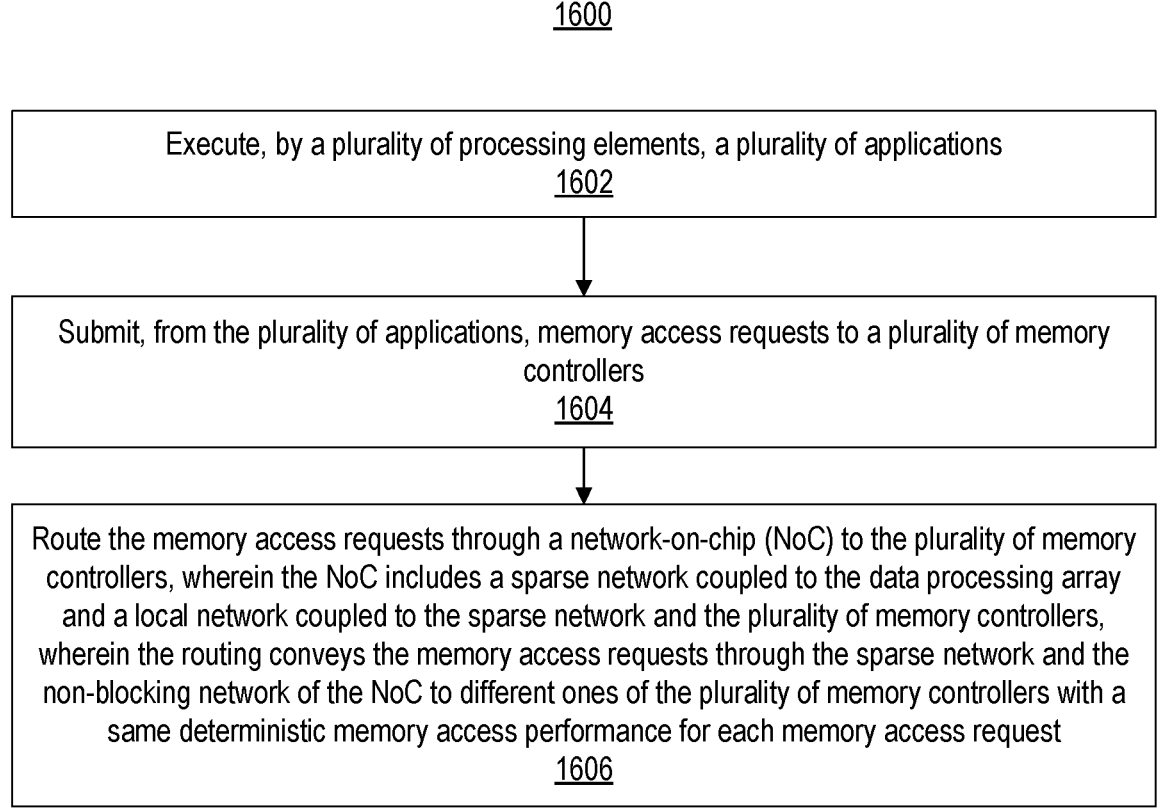
FIG. 16 illustrates an example method illustrating certain operational aspects of the example circuit architectures described within this disclosure.

FIG. 16 illustrates an example method 1600 illustrating certain operational aspects of the example circuit architectures described within this disclosure.

In block 1602, a plurality of applications may be executed by a plurality of PEs. As discussed, the PEs may be implemented as groups of array tiles of a data processing array, different portions of programmable logic, and/or hardened circuit blocks. In block 1604, from the plurality of applications, memory access requests are submitted to a plurality of memory controllers. The memory controllers may be HBM memory controllers or DDR memory controllers.

In block 1606, the memory access requests are routed through a NoC to the plurality of memory controllers. The NoC includes a sparse network coupled to the data processing array and a non-blocking network coupled to the sparse network and the plurality of memory controllers. The routing conveys the memory access requests through the sparse network and the non-blocking network of the NoC to different ones of the plurality of memory controllers with a same deterministic memory access performance for each memory access request.

In one aspect, the sparse network is a blocking network that includes a plurality of interconnected switches and each PE is communicatively linked to a selected memory controller of the plurality of memory controllers through a same number of the interconnected switches.

In another aspect, the non-blocking network includes a plurality of crossbars. Each crossbar couples the sparse network to a subset of the plurality of memory controllers.

In another aspect, the method includes re-mapping a selected application from a first PE of the plurality of PEs to a second PE of the plurality of PEs without changing the deterministic memory access performance of the application. In another aspect, the method includes changing a memory association of the selected application based on the re-mapping. In another aspect, the method includes re-mapping a region of memory accessed by a selected application to a different region of the memory without changing the deterministic memory access performance of the application.

In another aspect, the method includes configuring a portion of the NoC to couple the selected application with the different region of the memory using a different memory controller of the plurality of memory controllers.

In one or more example implementations, the mapping and/or re-mapping operations described herein may be performed at compile time of a design. In one or more other example implementations, the mapping and/or re-mapping operations described herein may be performed during runtime. That is, different configurations (e.g., mappings) may be created and implemented dynamically during runtime of the IC in the field.

Figure 17:
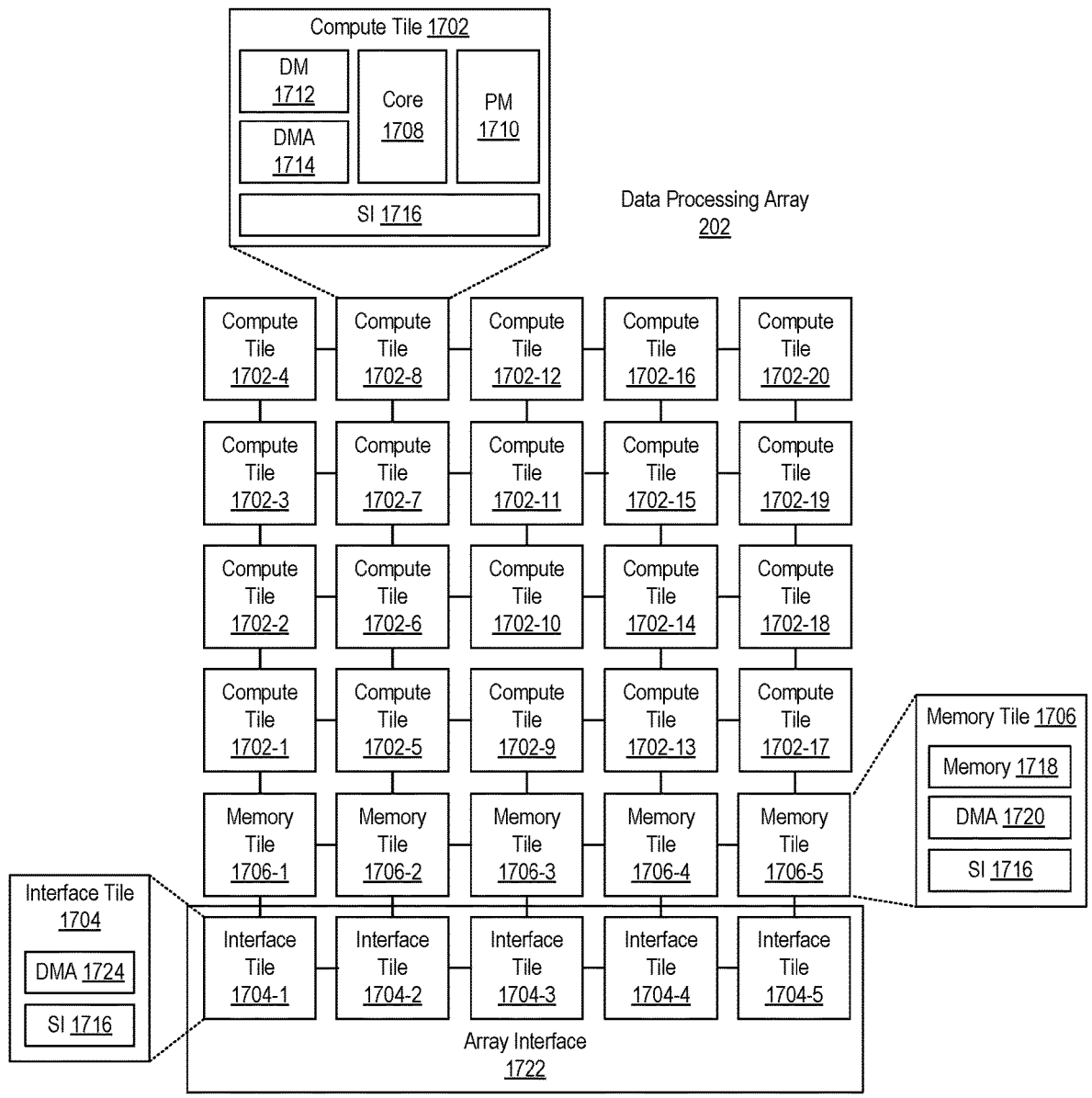
FIG. 17 illustrates an example implementation of a data processing array.

FIG. 17 illustrates an example implementation of data processing array 202. Data processing array 202 may be implemented as a plurality of interconnected tiles. The term "tile," as used herein in connection with a data processing array, means a circuit block. The interconnected tiles of data processing array 202 include compute tiles 1702 and interface tiles 1704. Data processing array 202 optionally includes one or more memory tiles 1706. The tiles illustrated in FIG. 17 may be arranged in an array or grid and are hardwired.

Each compute tile 1702 can include one or more cores 1708, a program memory (PM) 1710, a data memory (DM) 1712, a DMA circuit 1714, and a stream interconnect (SI) 1716. In one aspect, each core 1708 is capable of executing program code stored program memory 1710. In one aspect, each core 1708 may be implemented as a scalar processor, as a vector processor, or as a scalar processor and a vector processor operating in coordination with one another.

In one or more examples, each core 1708 is capable of directly accessing the data memory 1712 within the same compute tile 1702 and the data memory 1712 of any other compute tile 1702 that is adjacent to the core 1708 of the compute tile 1702 in the up (north), down (south), left (west), and/or right (east) directions. Core 1708 sees data memories 1712 within the same tile and in one or more other adjacent compute tiles as a unified region of memory (e.g., as a part of the local memory of the core 1708). This facilitates data sharing among different compute tiles 1702 in data processing array 202. In other examples, core 1708 may be directly connected to data memories 1712 in other compute tiles 1702.

Cores 1708 may be directly connected with adjacent cores 1708 via core-to-core cascade connections (not shown). In one aspect, core-to-core cascade connections are unidirectional and direct connections between cores 1708. In another aspect, core-to-core cascade connections are bidirectional and direct connections between cores 1708. In general, core-to-core cascade connections generally allow the results stored in an accumulation register of a source core 1708 to be provided directly to an input of a target or load core 1708 without traversing the stream interconnect 1716 (e.g., without using DMA 1714) and/or being written by a first core 1708 to data memory 1712 to be read by a different core 1708.

In an example implementation, compute tiles 1702 do not include cache memories. By omitting cache memories, data processing array 202 is capable of achieving predictable, e.g., deterministic, performance. Further, significant processing overhead is avoided since maintaining coherency among cache memories located in different compute tiles 1702 is not required. In a further example, cores 1708 do not have input interrupts. Thus, cores 1708 are capable of operating uninterrupted. Omitting input interrupts to cores 1708 also allows data processing array 202 to achieve predictable, e.g., deterministic, performance.

In the example of FIG. 17, each compute tile 1702 may be implemented substantially identically to include the same hardware components and/or circuitry. Further, data processing array 202 may include an array of compute tiles formed of any of a variety of processing elements such as digital signal processing engines, cryptographic engines, Forward Error Correction (FEC) engines, or other specialized hardware for performing one or more specialized tasks.

In one or more other examples, compute tiles 1702 may not be substantially identical. In this regard, compute tiles 1702 may include a heterogeneous mix of compute tiles 1702 formed of two or more different types of processing elements. As an illustrative and nonlimiting example, different ones of compute tiles 1702 may include processing elements selected from two or more of the following groups: digital signal processing engines, cryptographic engines, Forward Error Correction (FEC) engines, or other specialized hardware.

Data processing array 202 may include one or more memory tiles 1706. Memory tiles 1706 include a memory 1718 (e.g., a RAM), a DMA circuit 1720, and a stream interconnect 1716. Each memory tile 1706 may read and/or write to the memory 1718 of an adjacent memory tile 1706 by way of the DMA included in the memory tile 1706. Further, each compute tile 1702 in data processing array 202 is capable of reading and writing to any one or more of memory tiles 1706. Memory tiles 1706 are characterized by the lack of computational components such as processors (e.g., cores 1708).

Interface tiles 1704 form an array interface 1722 for data processing array 202. Array interface 1722 operates as an interface that connects tiles of data processing array 202 to other resources of the particular IC in which data processing array 202 is disposed. In the example of FIG. 17, array interface 1722 includes a plurality of interface tiles 1704 organized in a row. Interface tiles 1704 can include a stream interconnect 1716 and a DMA circuit 1724. Interface tiles 1704 are connected so that data may be propagated from one interface tile to another bi-directionally. Each interface tile 1704 is capable of operating as an interface for the column of tiles directly above and is capable of interfacing such tiles with components and/or subsystems of the IC including data processing array 202.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a plurality of processing elements;
a plurality of memory controllers; and
a network on chip (NoC) providing connectivity between the plurality of processing elements and the plurality of memory controllers, the NoC including:
a sparse network coupled to the plurality of processing elements, wherein the sparse network includes a plurality of interconnected switches having routing tables; and
a non-blocking network coupled to the sparse network and the plurality of memory controllers, wherein the non-blocking network includes a plurality of crossbars, each crossbar couples the sparse network to a subset of the plurality of memory controllers, and each subset includes at least a first memory controller and a second memory controller;
wherein the sparse network implements a first portion of a path coupling one or more selected processing elements of the plurality of processing elements to the non-blocking network, the non-blocking network implements a second portion of the path, and a crossbar of the second portion of the path connects the one or more selected processing elements to the first memory controller or the second memory controller while maintaining a same delay for memory access performance.

2. The system of claim 1, wherein one or more of the plurality of processing elements comprise a group of one or more array tiles of a data processing array.

3. The system of claim 1, wherein one or more of the plurality of processing elements are implemented using programmable logic or are hardened circuit blocks.

4. The system of claim 1, wherein the plurality of processing elements execute a plurality of applications, and each application has a same deterministic memory access performance in accessing associated ones of the plurality of memory controllers via the sparse network and the non-blocking network of the NoC.

5. The system of claim 1, wherein each processing element is communicatively linked to a selected crossbar of the plurality of crossbars through a vertical connection of the sparse network, wherein each vertical connection linking each processing element to the selected crossbar has a same latency.

6. The system of claim 1, wherein the sparse network is a blocking network and each processing element is communicatively linked to one or more selected memory controllers of the plurality of memory controllers through a same number of the interconnected switches.

7. The system of claim 1, wherein each crossbar is configured to provide a same latency for data conveyed from any input port to any output port of the crossbar.

8. The system of claim 7, wherein each crossbar of the non-blocking network selectively couples a processing element of the plurality of processing elements above the crossbar with at least one memory controller of the subset of the plurality of memory controllers coupled thereto.

9. The system of claim 1, wherein at least one of the plurality of memory controllers is a high-bandwidth memory controller.

10. The system of claim 1, wherein a selected application is re-mapped from a first processing element of the plurality of processing elements to a second processing element of the plurality of processing elements without changing a deterministic memory access performance of the selected application.

11. The system of claim 10, wherein a memory association of the selected application is changed based on the selected application as re-mapped.

12. The system of claim 1, wherein a region of memory accessed by a selected application is re-mapped to a different region of the memory without changing a deterministic memory access performance of the selected application.

13. The system of claim 12, wherein the different region of the memory is accessed by a different memory controller of the plurality of memory controllers.

14. A method, comprising:
executing, by a plurality of processing elements, a plurality of applications;
submitting, from the plurality of applications, memory access requests to a plurality of memory controllers; and
routing the memory access requests through a network-on-chip (NoC) to the plurality of memory controllers, wherein the NoC includes a sparse network coupled to the plurality of processing elements and a non-blocking network coupled to the sparse network and the plurality of memory controllers;
wherein the sparse network includes a plurality of interconnected switches having routing tables and wherein the non-blocking network includes a plurality of crossbars, each crossbar couples the sparse network to a subset of the plurality of memory controllers, and each subset includes at least a first memory controller and a second memory controller;
wherein the routing conveys at least one of the memory access requests from one or more selected processing elements of the plurality of processing elements through a first portion of a path implemented by the sparse network and a second portion of the path implemented by the non-blocking network to a first memory controller of the subset coupled to the crossbar of the path; and
configuring the crossbar of the path to connect the second memory controller of the subset while maintaining a same delay for memory access performance as for the first memory controller.

15. The method of claim 14, wherein the sparse network is a blocking network and each processing element is communicatively linked to a selected memory controller of the plurality of memory controllers through a same number of the interconnected switches.

16. The method of claim 14, wherein one or more of the plurality of processing elements includes a group of one or more array tiles of a data processing array.

17. The method of claim 14, further comprising:
re-mapping a selected application from a first processing element of the plurality of processing elements to a second processing element of the plurality of processing elements without changing a deterministic memory access performance of the selected application.

18. The method of claim 17, further comprising:
changing a memory association of the selected application based on the re-mapping.

19. The method of claim 14, further comprising:
re-mapping a region of memory accessed by a selected application to a different region of the memory without changing a deterministic memory access performance of the selected application.

20. The method of claim 19, further comprising:
configuring a portion of the NoC to couple the selected application with the different region of the memory using a different memory controller of the plurality of memory controllers.

\* \* \* \* \*